United States Patent
Monastyrshyn et al.

(10) Patent No.: US 10,996,811 B2
(45) Date of Patent: May 4, 2021

(54) AUGMENTED REALITY USER INTERFACE CONTROL

(71) Applicant: Snap Inc., Santa Monica, CA (US)

(72) Inventors: Yurii Monastyrshyn, Santa Monica, CA (US); Oleksandr Pyshchenko, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/547,045

(22) Filed: Aug. 21, 2019

(65) Prior Publication Data
US 2019/0377458 A1 Dec. 12, 2019

Related U.S. Application Data

(63) Continuation of application No. 15/853,264, filed on Dec. 22, 2017, now Pat. No. 10,430,016.

(51) Int. Cl.
*G06F 3/048* (2013.01)
*G06F 3/0481* (2013.01)
(Continued)

(52) U.S. Cl.
CPC ............ *G06F 3/0481* (2013.01); *G06F 3/011* (2013.01); *G06F 3/012* (2013.01);
(Continued)

(58) Field of Classification Search
CPC ..... G06T 19/006; G06T 15/205; G06T 13/40; G06T 2215/16; G06T 2200/24;
(Continued)

(56) References Cited

U.S. PATENT DOCUMENTS 6,038,295 A  3/2000 Mattes
6,980,909 B2  12/2005 Root et al.
(Continued)

FOREIGN PATENT DOCUMENTS

CA  2887596 A1  7/2015
CN  111492330 A  8/2020
(Continued)

OTHER PUBLICATIONS

Ohan Oda et al., Interference Avoidance in Multi-User hand-Held Augmented Reality, Oct. 1, 2009, IEEE Xplore, pp. 13-21 (Year: 2009).*

(Continued)

*Primary Examiner* — Tam T Tran
(74) *Attorney, Agent, or Firm* — Schwegman Lundberg & Woessner, P.A.

(57) ABSTRACT

Systems, devices, media, and methods are presented for controlling user interface with an object depicted within the user interface. The systems and methods initiates an augmented reality mode configured to present augmented reality elements within a graphical user interface. A face is detected within a field of view of an image capture component and presented within the graphical user interface. In response to detecting the face, the systems and methods sequentially present a set of augmented reality elements within the graphical user interface. A subset of the augmented reality elements and the face may be depicted contemporaneously. A movement is detected of at least a portion of the face relative to a first augmented reality element and presentation of the first augmented reality element is modified and at least one second augmented reality element is presented.

20 Claims, 15 Drawing Sheets

(51) Int. Cl.
*G06F 3/01* (2006.01)
*G06K 9/32* (2006.01)
*G06K 9/00* (2006.01)
*G06T 19/00* (2011.01)

(52) U.S. Cl.
CPC ..... *G06K 9/00228* (2013.01); *G06K 9/00671* (2013.01); *G06K 9/3233* (2013.01); *G06T 19/006* (2013.01)

(58) Field of Classification Search
CPC . G06T 2207/30201; G06T 2207/10016; G06F 3/0481; G06F 3/011; G06F 3/012; G06K 9/00228; G06K 9/00671; G06K 9/3233
See application file for complete search history.

(56) References Cited

U.S. PATENT DOCUMENTS

| | | |
|---|---|---|
| 7,173,651 B1 | 2/2007 | Knowles |
| 7,411,493 B2 | 8/2008 | Smith |
| 7,535,890 B2 | 5/2009 | Rojas |
| 8,131,597 B2 | 3/2012 | Hudetz |
| 8,199,747 B2 | 6/2012 | Rojas et al. |
| 8,332,475 B2 | 12/2012 | Rosen et al. |
| 8,718,333 B2 | 5/2014 | Wolf et al. |
| 8,724,622 B2 | 5/2014 | Rojas |
| 8,874,677 B2 | 10/2014 | Rosen et al. |
| 8,909,679 B2 | 12/2014 | Root et al. |
| 8,995,433 B2 | 3/2015 | Rojas |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,191,776 B2 | 11/2015 | Root et al. |
| 9,204,252 B2 | 12/2015 | Root et al. |
| 9,443,227 B2 | 9/2016 | Evans et al. |
| 9,489,661 B2 | 11/2016 | Evans et al. |
| 9,491,134 B2 | 11/2016 | Rosen et al. |
| 10,430,016 B2 | 10/2019 | Monastyrshyn et al. |
| 2011/0093820 A1* | 4/2011 | Zhang .................... A63F 13/10 715/863 |
| 2011/0158546 A1 | 6/2011 | Huang et al. |
| 2011/0199302 A1* | 8/2011 | Tossell .................... G06F 3/011 345/158 |
| 2011/0202598 A1 | 8/2011 | Evans et al. |
| 2011/0250962 A1* | 10/2011 | Feiner .................... A63F 13/211 463/31 |
| 2012/0209924 A1 | 8/2012 | Evans et al. |
| 2013/0016102 A1 | 1/2013 | Look et al. |
| 2014/0139424 A1 | 5/2014 | Chang |
| 2015/0018093 A1* | 1/2015 | Solaja .................... G07F 17/3209 463/31 |
| 2016/0274762 A1 | 9/2016 | Lopez et al. |
| 2019/0196663 A1 | 6/2019 | Monastyrshyn et al. |

FOREIGN PATENT DOCUMENTS

| | | |
|---|---|---|
| EP | 2759909 A2 | 7/2014 |
| WO | WO-2017213558 A2 | 12/2017 |
| WO | WO-2019126526 A1 | 6/2019 |

OTHER PUBLICATIONS

Shuhong Xu et al., Tennis Space3: An Interactive and Immersive Environment for Tennis Simulation, Sep. 1, 2009, IEEE Computer Society, pp. 652-656 (Year: 2009).*
U.S. Appl. No. 15/853,264, filed Dec. 22, 2017, Augmented Reality User Interface Control.
"U.S. Appl. No. 15/853,264, Notice of Allowance dated May 31, 2019", 9 pgs.
"International Application Serial No. PCT/US2018/066841, International Search Report dated Mar. 11, 2019", 5 pgs.
"International Application Serial No. PCT/US2018/066841, Written Opinion dated Mar. 11, 2019", 7 pgs.
Cordeiro, Diogo, et al., "ARZombie: A Mobile Augmemed Reality Game with Multimodal Interaction", Intetain, (Jun. 1, 2015), 15 pgs.
Ismail, Ajune Wanis, et al., "Collaborative Augmented Reality Approach for Multi-user Interaction in Urban Simulation", Intl. Conference on Information and Multimedia Technology, IEEE Computer Society, (2009), 5 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
"International Application Serial No. PCT/US2018/066841, International Preliminary Report on Patentability dated Jul. 2, 2020", 9 pgs.

* cited by examiner

AUGMENTED REALITY USER INTERFACE CONTROL

CLAIM FOR PRIORITY

This application is a continuation of and claims the benefit of priority of U.S. application Ser. No. 15/853,264, filed Dec. 22, 2017, which is hereby incorporated by reference in its entirety.

TECHNICAL FIELD

Embodiments of the present disclosure relate generally to controlling a user interface with an object depicted within the user interface. More particularly, but not by way of limitation, the present disclosure addresses systems and methods for capturing a representation of a real-world object and depicting the real-world object within a graphical user interface while controlling at least a portion of the graphical user interface with the object.

BACKGROUND

Telecommunications applications and devices can provide communication between multiple users using a variety of media, such as text, images, sound recordings, and/or video recording. For example, video conferencing allows two or more individuals to communicate with each other using a combination of software applications, telecommunications devices, and a telecommunications network. Telecommunications devices may also record video streams to transmit as messages across a telecommunications network. Some telecommunications applications enable touch based control, gesture based interactions with a touchscreen, and other user interactions with a graphical user interface. Further, some telecommunications applications allow a user to control options of a communications session through screen or keyboard interaction while images captured by a camera are presented within the graphical user interface.

BRIEF DESCRIPTION OF THE DRAWINGS

Various ones of the appended drawings merely illustrate example embodiments of the present disclosure and should not be considered as limiting its scope.

Figure 1:
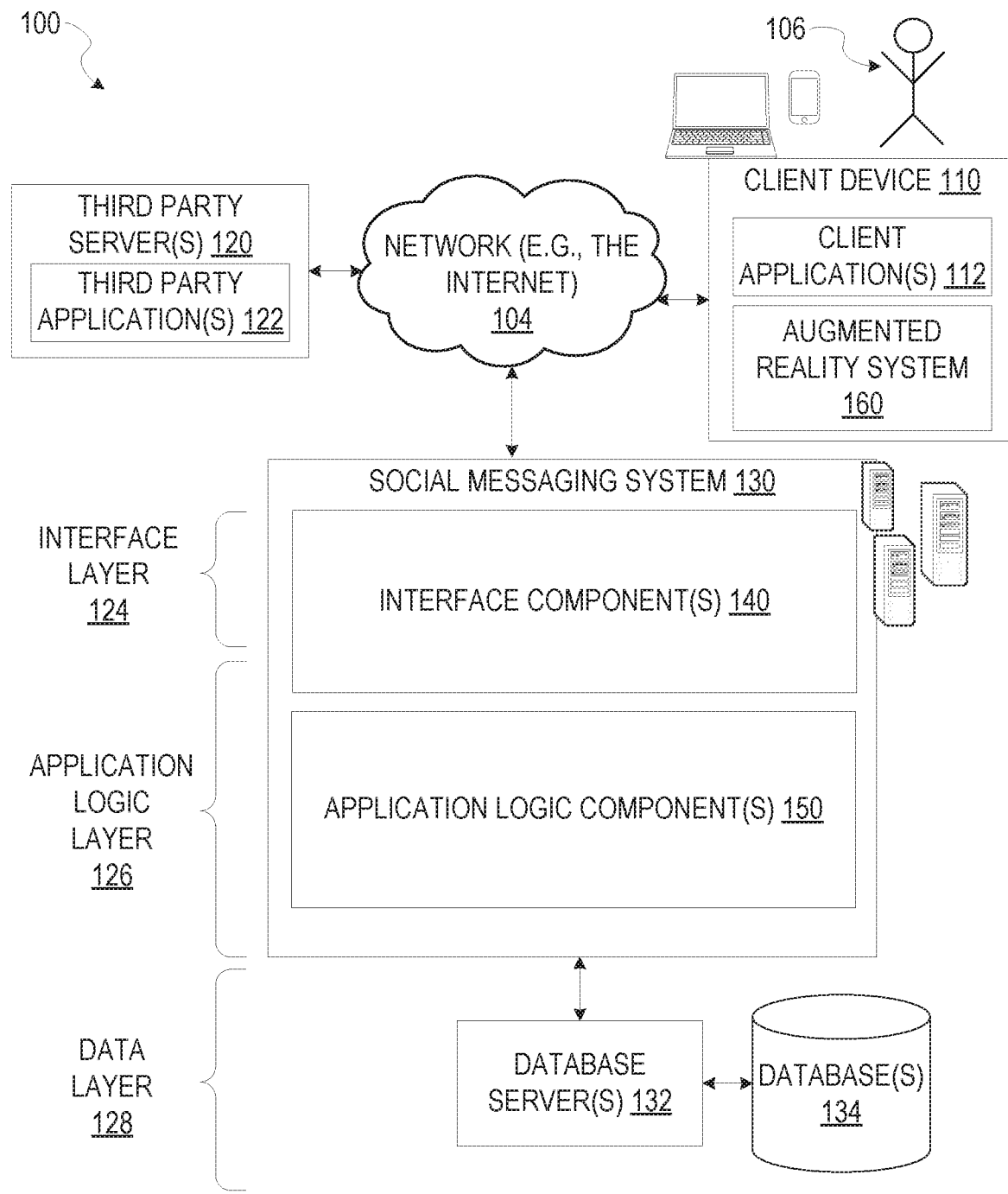
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, yell-known instruction instances, protocols, structures, and techniques are not necessarily shown in detail.

Some aspects of the present disclosure describe an augmented reality system. Some embodiments of the augmented reality system are configured to enable control of a device (e.g., a smartphone) or graphical user interface presented on a device using an object depicted within the user interface. The augmented reality system may enable control of the device through manipulation of functions or operations within the graphical user interface, a game, a software program, haptic feedback system, social messaging or social networking programs and systems, browsers, a communications network, or any other suitable interface. The augmented reality system may use image capture devices (e.g., cameras) associated with the device to capture video streams, sets of frames, or sets of images which include the object. While the video stream is being captured, the object is depicted within a graphical user interface on a display component of the device and movement of the object within the video stream causes control or interaction of one or more of the device and the graphical user interface in which the object is depicted.

Where the augmented reality system enables control of a game, the augmented reality system may capture video stream of a control object such as a face or hand. The control object is then rendered or displayed within a graphical user interface presented on a screen of a device, such as a smartphone. The augmented reality system then generates augmented reality elements with which the user interacts or manipulates to control or navigate the game environment. For example, where the control object is a face, a front facing camera of a smartphone may capture a video stream including the face of the user. The user's face may be shown within the game environment on the graphical user interface. The augmented reality system may then generate objects (e.g. tomatoes, pies, spoons of baby food) flying or falling toward the face within the graphical user interface. The user may then move their face or move the smartphone, while maintaining their face within the field of view of the front facing camera, to avoid the objects (e.g., dodging flying tomatoes or pies) or catch the objects (e.g., catch a spoon of baby food in the user's mouth). Once the objects are dodged or caught, the objects may disappear or be replaced with a remnant (e.g., splattered portions of a tomato or pie). The augmented reality system may then generate new objects to continue gameplay.

In some gaming environments, the user may also interact with persistent objects which remain with the control object in the gaming environment. For example, where the control object is the user's head or face, the user may position their head or face in a field of view of the front facing camera of a smartphone. The camera may capture a video stream including the user's face and the augmented reality system may provide the user's face within the gaming environment. The augmented reality system then generates a persistent element (e.g., a ball). The augmented reality system may then drop the ball toward the user's face. By moving their head or the smartphone, while the user's face is in view of the front facing camera, the augmented reality system manipulates movement of the ball such that the ball appears to bounce against the user's forehead. The augmented reality system may generate additional user interface elements such as a score board, point indicators, status indicators, celebration graphics, and the like to represent a number of consecutive bounces of the ball, a score, an achievement, or any other suitable interaction.

The above is one specific example. The various embodiments of the present disclosure relate to devices and instructions by one or more processors of a device to control a user interface with a real-world object captured in a video stream and depicted within the user interface. An augmented reality system is described that enables control of functions of one or more of a device and a graphical user interface by manipulating a position, angle, rotation, size, distance, or any other suitable aspect of the object depicted within the user interface.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., transferring communications data, receiving and transmitting indications of communication sessions, etc.) associated with the network system 100 and its users. Although illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each component or engine shown in FIG. 1 represents a set of executable software instructions and the corresponding hardware (e.g., memory and processor) for executing the instructions, forming a hardware-implemented component or engine and acting, at the time of the execution of instructions, as a special purpose machine configured to carry out a particular set of functions. To avoid obscuring the inventive subject matter with unnecessary detail, various functional components and engines that are not germane to conveying an understanding of the inventive subject matter have been omitted from FIG. 1. Of course, additional functional components and engines may be used with a social messaging system, such as that illustrated in FIG. 1, to facilitate additional functionality that is not specifically described herein. Furthermore, the various functional components and engines depicted in FIG. 1 may reside on a single server computer or client device, or may be distributed across several server computers or client devices in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface component(s) (e.g., a web server) 140, which receives requests from various client-computing devices and servers, such as client device 110 executing client application(s) 112, and third party servers) 120 executing third party application(s) 122. In response to received requests, the interface component(s) 140 communicates appropriate responses to requesting devices via a network 104. For example, the interface component(s) 140 can receive requests such as Hypertext Transfer Protocol (HTTP) requests, or other web-based, Application Programming Interface (API) requests.

The client device 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). Further, in some example embodiments, the client device 110 forms all or part of augmented reality system 160 such that components of the augmented reality system 160 configure the client device 110 to perform a specific set of functions with respect to operations of the augmented reality system 160.

In an example, the client device 110 is executing the client application(s) 112. The client application(s) 112 can provide functionality to present information to a user 106 and communicate via the network 104 to exchange information with the social messaging system 130. Further, in some examples, the client device 110 executes functionality of the augmented reality system 160 to control a user interface with a real-world object, captured in a video stream and depicted within the user interface.

Each client device 110 can comprise a computing device that includes at least a display and communication capabilities with the network 104 to access the social messaging system 130, other client devices, and third party server(s) 120. Client devices 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. User 106 can be a person, a machine, or other means of interacting with the client device 110. In some embodiments, the user 106 interacts with the social messaging system 130 via the client device 110. The user 106 may not be part of the networked system 100, but may be associated with the client devices 110.

As shown in FIG. 1, the data layer 128 has database server(s) 132 that facilitate access to information storage repositories or database(s) 134. The database(s) 134 are storage devices that store data such as member profile data, social graph data (e.g., relationships between members of the social messaging system 130), image modification preference data, accessibility data, and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic components 150, which, in conjunction with the interface component(s) 140, generate various user interfaces with data retrieved from various data sources or data services in the data layer 128. Individual application logic components 150 may be used to implement the functionality associated with various applications, services, and features of the social messaging system 130. For instance, a social messaging application can be implemented with at least a portion of the application logic components 150. The social messaging application provides a messaging mechanism for users of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic components 150.

As illustrated in FIG. 1, the social messaging system 130 may include at least a portion of the augmented reality system 160 capable of controlling a user interface with an object depicted the user interface. Similarly, the client device 110 includes at least a portion of the augmented reality system 160, as described above. In other examples, client device 110 may include the entirety of the augmented reality system 160. In instances where the client device 110 includes a portion of (or all of) the augmented reality system 160, the client device 110 can work alone or in cooperation with the social messaging system 130 to provide the functionality of the augmented reality system 160 described herein.

In some embodiments, the social messaging system 130 may be an ephemeral message system that enables ephemeral communications where content (e.g., video clips or images) are deleted following a deletion trigger event such as a viewing time or viewing completion. In such embodiments, a device uses the various components described herein within the context of any of generating, sending, receiving, or displaying aspects of an ephemeral message. For example, a device implementing the augmented reality system 160 may enable interaction between users of the social messaging system (e.g., playing catch). The device may enable, generate, and transmit representations of the interaction between users as a part of a generation of content for an ephemeral message. Once an interaction session is complete, the deletion trigger may be enabled to delete records or representations of the interaction.

Figure 2:
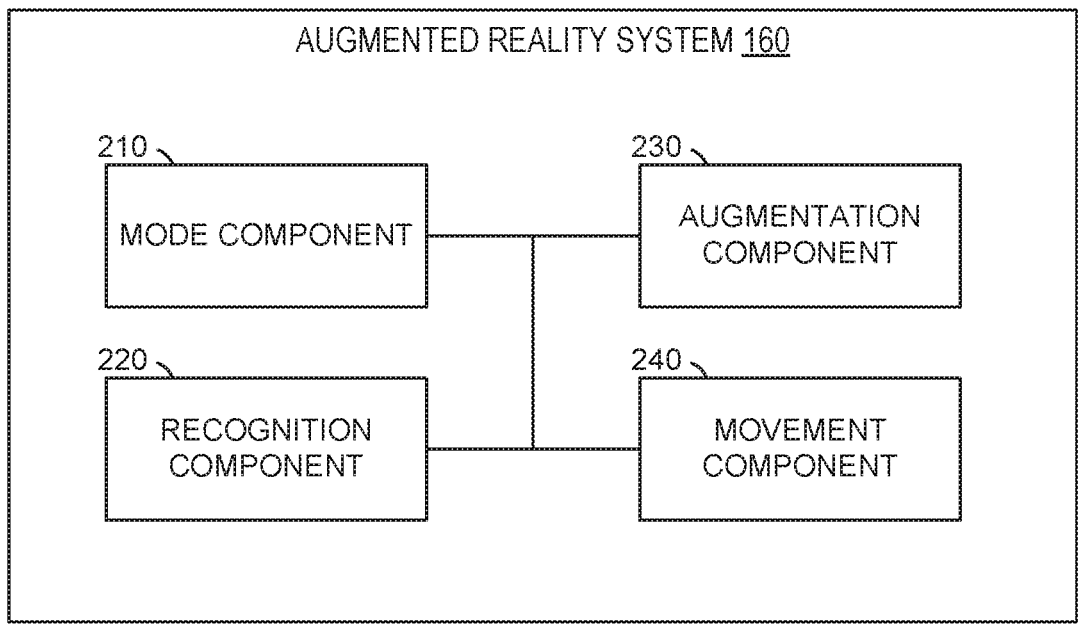
FIG. 2 is a diagram illustrating an augmented reality system, according to some example embodiments.

In FIG. 2, in various embodiments, the augmented reality system 160 can be implemented as a standalone system or implemented in conjunction with the client device 110, and is not necessarily included in the social messaging system 130. The augmented reality system 160 is shown to include a mode component 210, a recognition component 220, an augmentation component 230, and a movement component 240. All, or some, of the components 210-240, communicate with each other, for example, via a network coupling, shared memory, and the like. Each component of components 210-240 can be implemented as a single component, combined into other components, or further subdivided into multiple components. Other components not pertinent to example embodiments can also be included, but are not shown.

Figure 3:
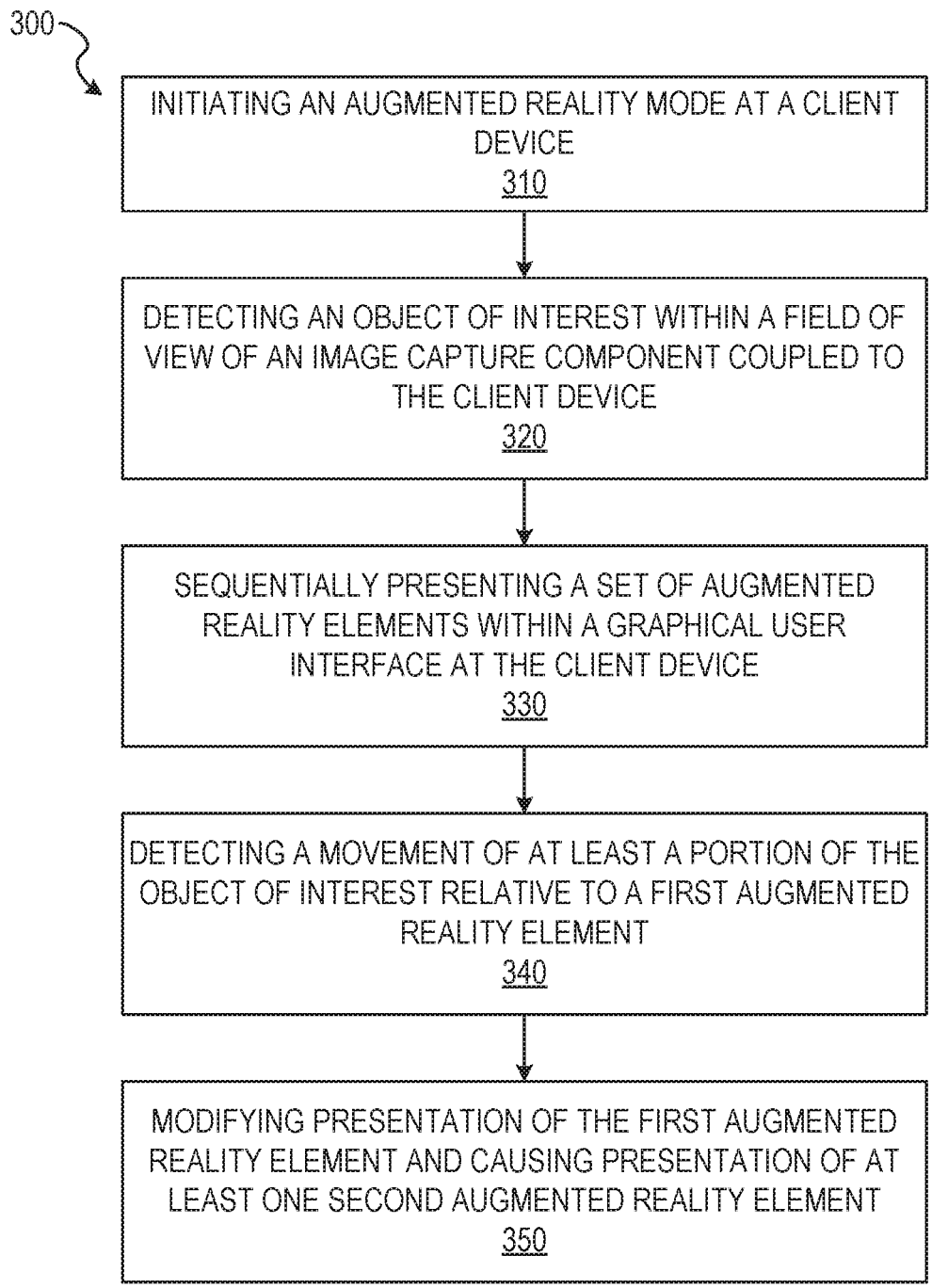
FIG. 3 is a flow diagram illustrating an example method for controlling a user interface with an object depicted within the user interface, according to some example embodiments.

FIG. 3 depicts a flow diagram illustrating an example method 300 for controlling a user interface with an object depicted the user interface, according to some example embodiments. The operations of method 300 may be performed by components of the augmented reality system 160, and are so described below for purposes of illustration.

In operation 310, the mode component 210 initiates an augmented reality mode of the client device 110. In some embodiments, the augmented reality mode is configured to present augmented reality elements within a graphical user interface presented on a display component of the client device 110. The augmented reality mode may be initiated in response to selection of an icon or other selectable interface element. Upon selection of the icon, the mode component 210 initiates the augmented reality mode which may comprise or include software configured to perform operations described below. For example, the mode component 210 may initiate the augmented reality mode by opening an augmented reality program and executing one or more processor-readable instructions to cause presentation of a graphical user interface on a display component of the client device 110. In some instances, the graphical user interface initially includes at least a portion of a field of view of an image capture component of the client device 110. For example, the graphical user interface may initially include a portion of a field of view of a front-facing camera of a smartphone.

In some embodiments, the graphical user interface initially includes one or more instructions for a user interacting with the client device 110. The instructions may indicate one or more of a set of rules for a game, an initial object window (e.g., an area designated for an initial placement of an object of interest or control object for the graphical user interface), a set of control operations, and any other suitable information. In some instances, the graphical user interface includes one or more selectable interface elements. The selectable interface elements may represent selectable options for a game played using the augmented reality system 160, modifying objects presented within the field of view of the image capture component of the client device 110, modifying the field of view of the image capture component, or any other suitable selectable options associated with the augmented reality system 160.

Figure 4:
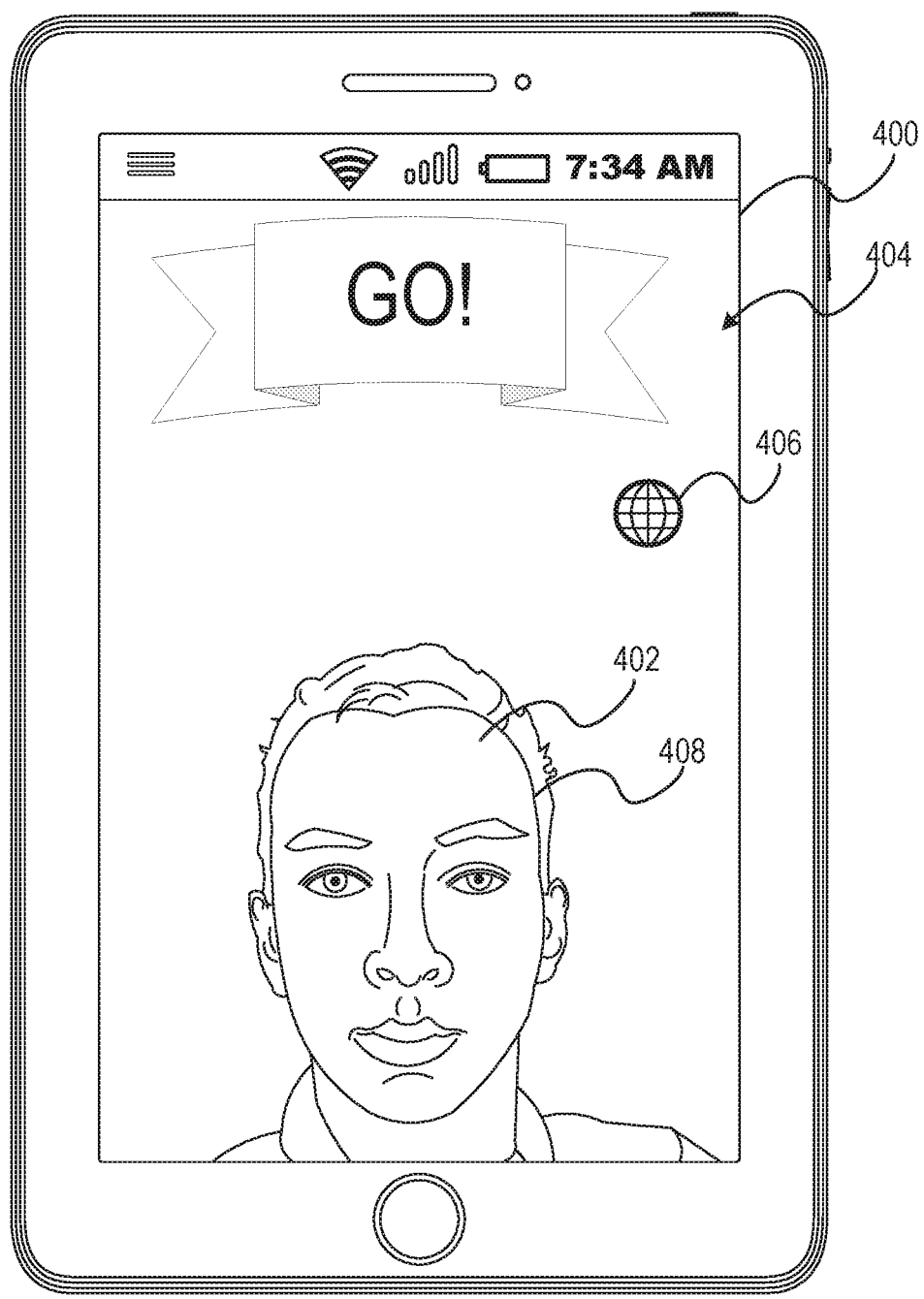
FIG. 4 is a user interface diagram depicting control of a user interface with an object depicted within the user interface, according to some example embodiments.

In operation 320, the recognition component 220 detects an object of interest within a field of view of an image capture component coupled to the client device 110. In some embodiments, the object of interest is a face of a user operating or proximate to the client device 110 and within the field of view of the image capture component, as shown in FIG. 4. For example, the client device 110 may enable image capture using a forward-facing image capture component (e.g., a selfie camera) of the client device 110. The user of the client device 110 may be positioned within the field of view of the forward-facing image capture component. Once the forward-facing image capture component initiates image capture of the field of view, the captured images (e.g., frames in a video stream) may be passed to the recognition component 220. The recognition component 220 may then detect the face 402 of the user and display the face 402 on the display component of the client device 110 within a graphical user interface 400.

As referenced above, in some embodiments, the recognition component 220 receives or otherwise accesses one or more images depicting at least a portion of a face. In some embodiments, the recognition component 220 receives the one or more images as a video stream captured by the image capture component associated with the client device 110 and presented on a user interface of an augmented reality mode. The recognition component 220 may directly receive the one or more images or the video stream captured by the image capture component. In some instances, the recognition component 220 passes all or a part of the one or more images or the video stream (e.g., a set of images comprising the video stream) to one or more components of the augmented reality system 160 for further processing and manipulation, as described below in more detail.

In some embodiments, the recognition component 220 is configured to detect a predetermined object or type of object. For example, the recognition component 220 may be configured to detect or identify a person, a face, a facial feature, a hand, or any other object or type of object appearing in the field of view of the image capture component. The recognition component 220 may be configured to detect the object or object type from a set of objects or object types. The recognition component 220 may also be configured to detect the object or type of object based on a mode (e.g., the augmented reality mode). In such embodiments, the mode may be selected from a plurality of modes, where each mode is associated with a specified object or type of object.

The recognition component 220 may determine the object of interest based on a size, a position, a prominence, a shape, a color, changes in color, a set of reference points, edge detection operations, object tracking operations, or any other suitable definable or detectable aspects of the object. For example, in some embodiments, the recognition component 220 may employ a set of face tracking operations to determine one or more landmarks associated with a face positioned within the field of view of the image capture component. The recognition component 220 may determine, based on detected landmarks, that the face depicted within the field of view is the object of interest. In some embodiments, the recognition component 220 applies a facial mesh to the object of interest (e.g., the face), such that positions of the one or more landmarks within one or more frames of the video stream are known. The recognition component 220 may track the landmarks once the positions of the one or more landmarks are known within at least a portion of the frames of the video stream.

In operation 330, the augmentation component 230 sequentially presents a set of augmented reality elements within the graphical user interface. In some embodiments, as shown in FIG. 4, a set of augmented reality elements 404 are presented in response to the recognition component 220 detecting the object of interest (e.g., the face 402) within the field of view of the image capture component. The augmentation component 230 may present the set of augmented reality elements 404 in the graphical user interface 400 such that a subset of augmented reality elements and the object of interest (e.g., the face 402 of the user) are depicted within the graphical user interface 400 contemporaneously.

Figure 5:
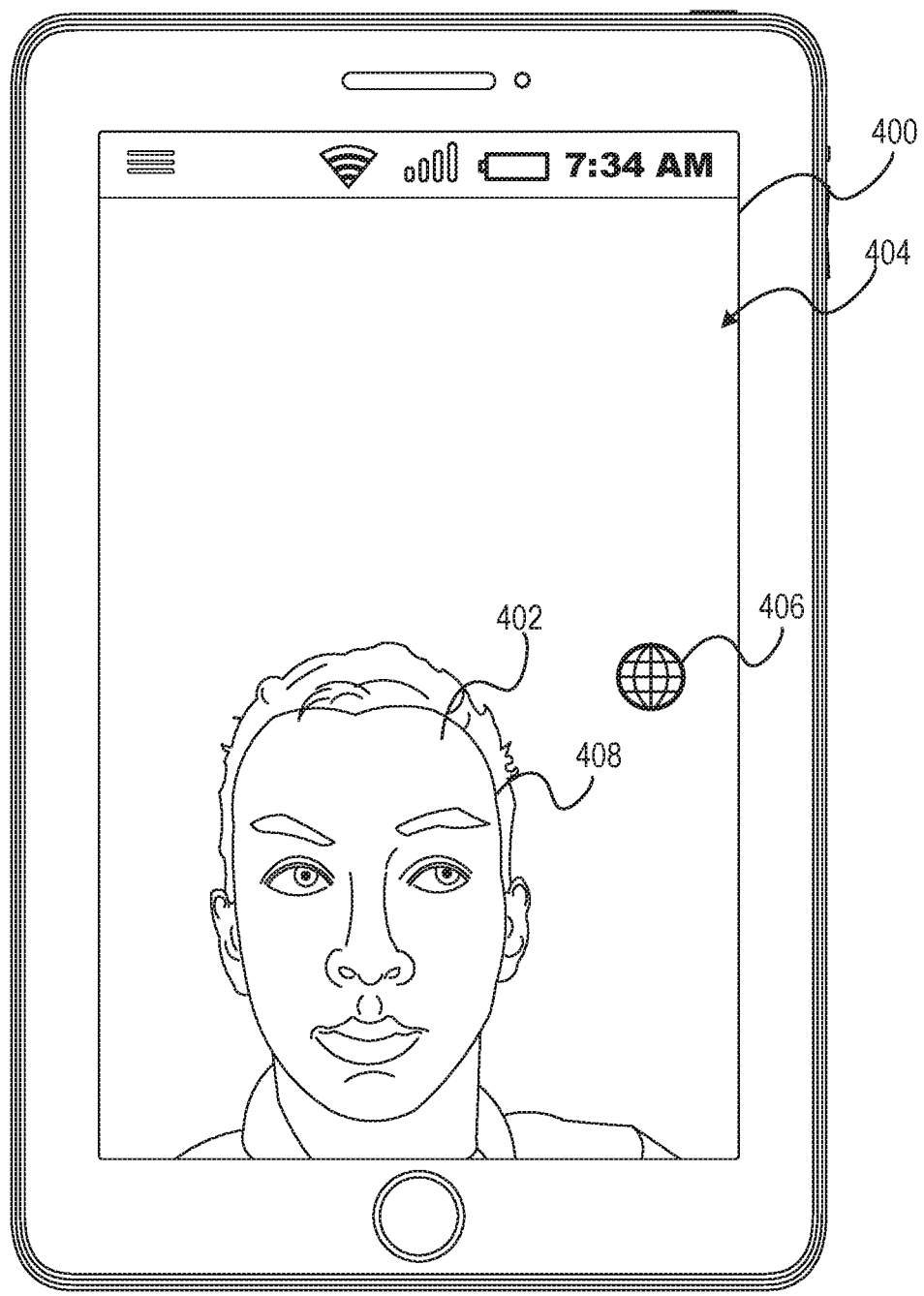
FIG. 5 is a user interface diagram depicting control of a user interface with an object depicted within the user interface, according to some example embodiments.
Figure 6:
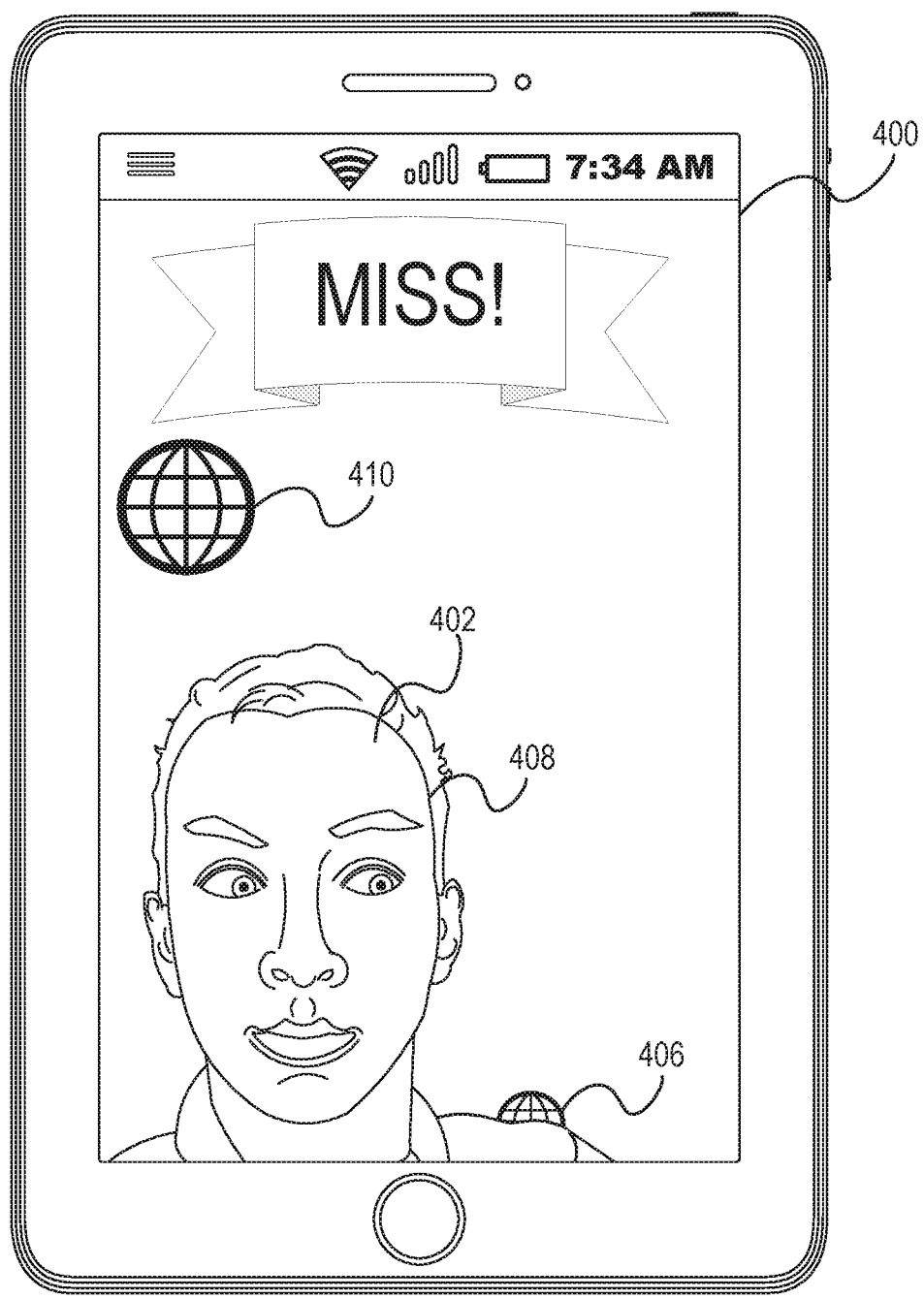
FIG. 6 is a user interface diagram depicting control of a user interface with an object depicted within the user interface, according to some example embodiments.

In some embodiments, the augmentation component 230 presents one or more augmented reality element upon initiation of a session, such as a game play session of the augmented reality mode. For example, the augmentation component 230 may be passed an indication of a user interface selection initiating a session for the augmented reality mode. The augmentation component 230 may then present a first augmented reality element 406 within the graphical user interface 400 along with the object of interest 402, as shown in FIG. 4. The first augmented reality element 406 may be initially presented in a first position. In some instances, upon presentation within the graphical user interface 400, the first augmented reality element 406 may be presented with a velocity, such that the first augmented reality element 406 travels along a path within the graphical user interface 400. As shown in FIGS. 4-6, while traveling along the path, the first augmented reality element 406 may change positions on the graphical user interface 400 in successively captured and presented frames depicted on the display component of the client device 110.

In some embodiments, the one or more augmented reality elements comprise an interactive environment. In such embodiments, the face 402 may be presented within or on a graphically generated body, such as an animated character, an avatar, a suit (e.g., a space suit, a flight suit, a set of clothing), or any other suitable body. The one or more augmented reality elements may comprise a background, one or more interactive objects (e.g., trees, flowers, clouds, characters, animals, etc.). A first portion of the augmented reality elements (e.g., a background and a body) may be presented contemporaneously, with a second portion of the augmented reality elements (e.g., trees, animals, and debris) presented sequentially responsive to movements of the face 402.

In operation 340, the movement component 240 detects a movement of at least a portion of the object of interest 402 relative to a first augmented reality element 406 of the subset of augmented reality elements. In some embodiments, the movement component 240 detects movement of the portion of the object of interest 402 by tracking movement of a reference feature 408. For example, the movement component 240 may detect movement of the face 402 by detecting movement of the reference feature 408, where the reference feature 408 is one or more points defining a perimeter of the face 402. In some instances, the reference feature 408 comprises one or more of a set of facial landmarks, a facial feature (e.g., a nose, one or more eyes, a mouth, a jaw line, a hair line, facial reference points representing one or more feature, combinations thereof, or any other suitable facial feature), a facial characteristic, or any other identifiable or distinguishable aspect of the face.

As shown in FIGS. 4-6, the movement component 240 may detect movement by comparing a position of the face 402 (e.g., the object of interest 402) in two or more frames of the video stream, FIGS. 4 and 5. In detecting the movement of the object of interest 402, the movement component 240 may determine a first position for the reference feature 408 in a first frame (e.g., FIG. 4). The reference feature 408 may be one or more of a set of landmarks, a set of edges, or any other distinguishing aspect of the object of interest 402. The movement component 240 may then determine or detect a second position for the object of interest 402 or the reference feature 408 in a second frame (e.g., FIG. 5). Where the first position and the second position differ, the movement component 240 may detect movement of the object of interest 402. In some embodiments, the movement component 240 determines movement by detecting an average position for the object of interest 402 or the reference feature for a plurality of frames (e.g., successive or consecutive frames, or non-consecutive frames).

In some embodiments, where the augmented reality elements comprise an environment, the movement of the portion of the object of interest may cause the object of interest to be presented at varying locations or change locations within the graphical user interface. The object of interest may interact with a portion of the augmented reality elements (e.g., the first augmented reality element) by changing positions of the object of interest to avoid, contact, catch, jump over, or otherwise perform an action or set of actions relative to at least one augmented reality element. For example, the object of interest may be presented within an augmented reality environment and depicted as a person skiing down a hill. Movement of the object of interest (e.g., the face) may control movement of a body or avatar including the object of interest about the graphical user interface to avoid obstacles (e.g., a portion of augmented reality elements), collect or contact goals (e.g., a portion of augmented reality elements), and proceed down a rendered ski slope. Movement of the object of interest may also be used to control any suitable movement through an augmented reality environment, such as flying, running, sliding, swimming, or any other suitable method of travel or navigation. In some embodiments, movement of the object of interest, such as a head, may be performed by moving the object of interest within the view of an image capture device while maintaining a static position of the image capture device. For example, a person, holding up a camera, may retain the camera in a static position while moving their head. The movement may control graphical elements depicted on the screen of the camera (e.g., a smartphone display), movement or changes in an environment depicted on the screen, generation of new elements, progression through a game, or any other suitable changes.

In operation 350, the augmentation component 230 modifies presentation of the first augmented reality element and causes presentation of at least one second augmented reality element of the subset of augmented reality elements. The augmentation component 230 may modify the first augmented reality element based on movement of or proximity to the object of interest or the reference feature. The augmentation component 230 may present the at least one second augmented reality element in response to the modification of the first augmented reality element. As shown in FIGS. 4-6, the augmented reality component 230 and the movement component 240 track the first augmented reality element 406 and the object of interest 402 within the frames or images comprising the video stream. As the first augmented reality element 406 approaches the object of interest 402, the object of interest 402 may move out of a perceived path or trajectory of the first augmented reality element 406. As shown in FIG. 6, the first augmented reality element 406 may be modified by changing an amount of the first augmented reality element 406 depicted within the graphical user interface 400. For example, the first augmented reality element 406 may be depicted as passing behind the object of interest 402 or a portion of the user associated with the object of interest 402.

In some embodiments, as shown in FIG. 6, upon modifying the first augmented reality element 406, the augmentation component 230 may cause presentation of at least one second augmented reality element 410. Similar to the manner described above with respect to the first augmented reality element 406, the at least one second augmented reality element 410 may be presented as traveling along a trajectory within the graphical user interface 400. In some embodiments, the at least one second augmented reality element 410 may be of a shape, size, type, or other set of characteristics similar to the first augmented reality element 406. The at least one second augmented reality element 410 may also include additional augmented reality elements indicating modification of the first augmented reality element 406. For example, an augmented reality element may be generated and presented which indicates the first augmented reality element 406 missed the object of interest 402 or hit the object of interest 402. Augmented reality elements may also be presented which indicate a score or accumulated points, a incrementation of a number (e.g., a number of misses, a number of hits, a point or score total, etc. a celebration effect, changes of colors, or any other suitable augmentation of the video stream.

Figure 7:
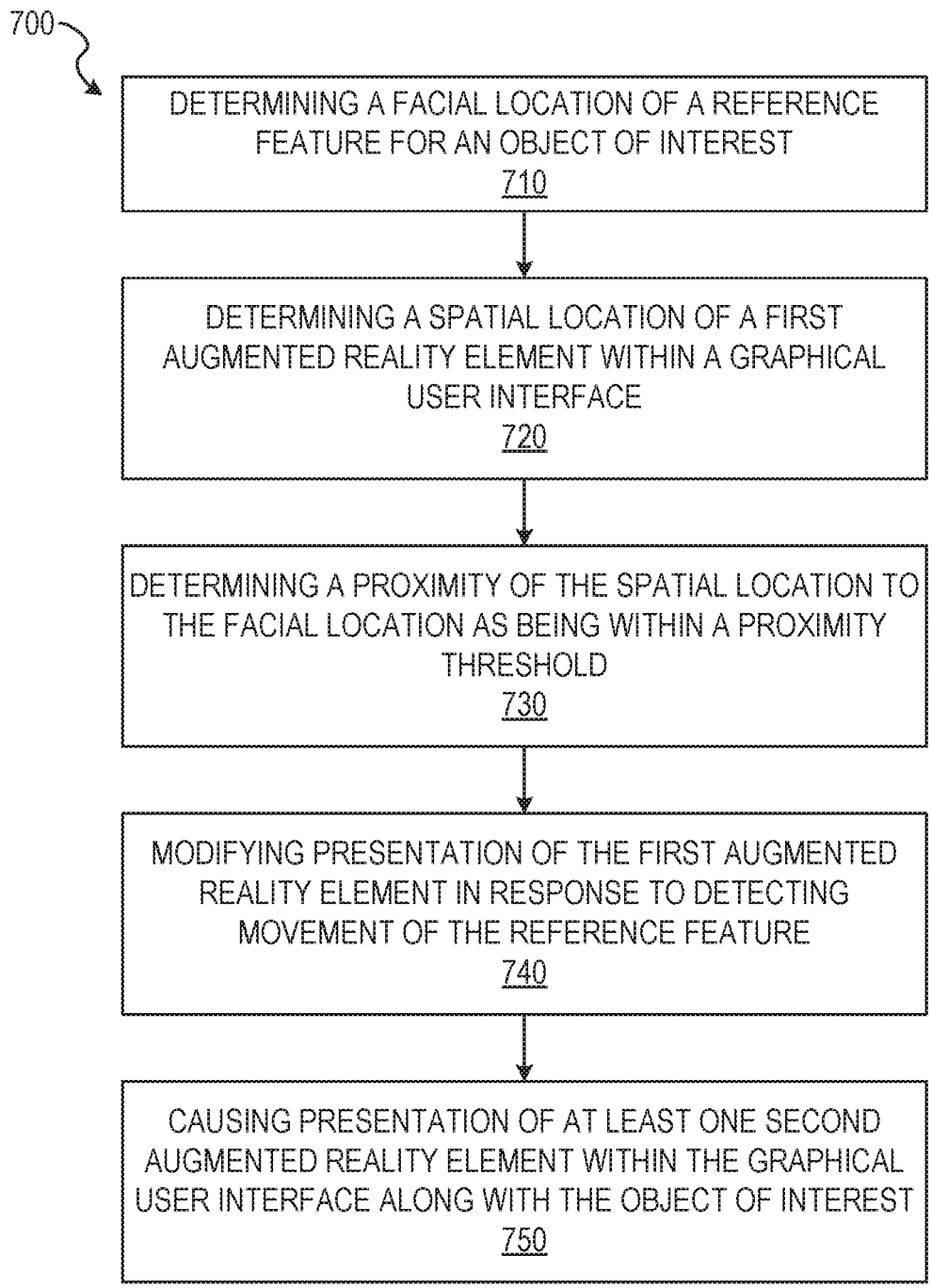
FIG. 7 is a flow diagram illustrating an example method for controlling a user interface with an object depicted within the user interface, according to some example embodiments.

FIG. 7 depicts a flow diagram illustrating an example method 700 for controlling a user interface with an object depicted the user interface, according to some example embodiments. The operations of method 700 may be performed by components of the augmented reality system 160. In some instances, certain operations of the method 700 may be performed using one or more operations of the method 300 or as sub-operations of one or more operations of the method 300, as will be explained in more detail below.

In operation 710, one or more of the recognition component 220 and the movement component 240 determines a facial location of a reference feature for the object of interest. In some embodiments, the recognition component 220 identifies one or more facial landmarks on the object of interest (e.g., a face). The recognition component 220 applies a facial mesh to the face. One or more vertices of the facial mesh may correspond to the one or more facial landmarks. The recognition component 220 may determine the facial location of the reference feature from one or more vertices of the facial mesh or the one or more landmarks. For example, at least a portion of the one or more vertices may be associated with specified facial features. Upon applying the facial mesh to the face, the recognition component 220 may select the vertices or facial landmarks for the reference feature based on the known association of the facial features with the vertices of the facial mesh.

In some instances, the recognition component 220 determines the facial location of the reference feature by identifying a plurality of facial landmarks on the object of interest. Once the facial landmarks are identified, the recognition component 220 selects one or more facial landmarks associated with the reference feature. The one or more facial landmarks may define the reference feature, represent one or more points or aspects of the reference feature, or otherwise be associated with the reference feature.

Figure 8:
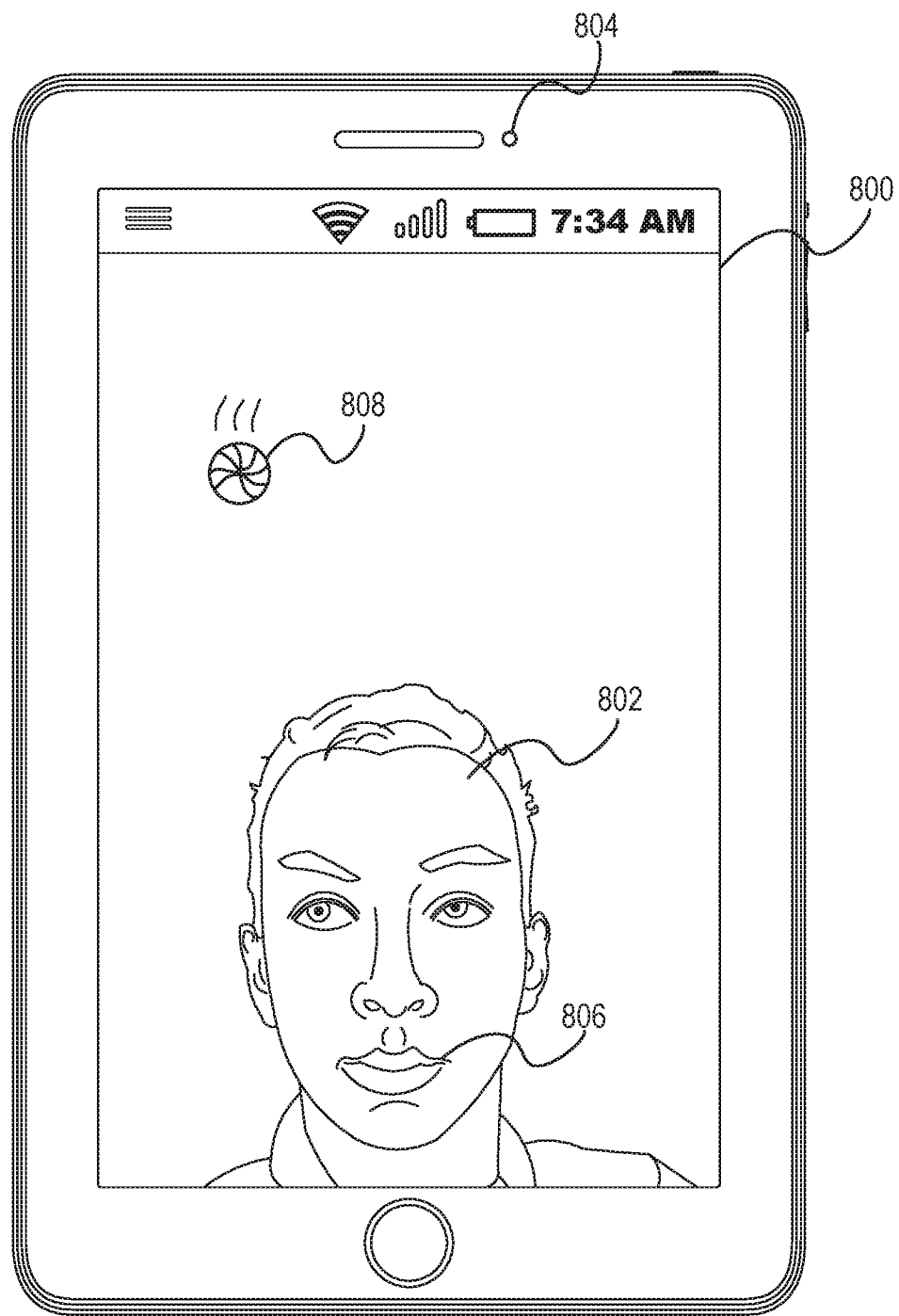
FIG. 8 is a user interface diagram depicting control of a user interface with an object depicted within the user interface, according to some example embodiments.

For example, as shown in FIG. 8 the augmentation component 230 may initially present a graphical user interface 800 depicting an object of interest 802 (e.g., a face of the user) within a field of view of an image capture component 804 of the client device 110. The recognition component 220 then determines the facial location of a reference feature 806 (e.g., a mouth) depicted on the object of interest 802. The augmentation component 230 then presents a first augmented reality element 808. As will be explained below in more detail, the first augmented reality element 808 may be presented at a first position and depicted as following a trajectory, path, or otherwise change position from the first position to a second position.

In operation 720, the augmentation component 230 determines a spatial location of a first augmented reality element within a graphical user interface. As shown in FIG. 8, the augmentation component 230 may present the first augmented reality element 808 and determine or identify the spatial location of the first augmented reality element 808 in the graphical user interface 800 at a time subsequent to presentation of the first augmented reality element 808. In some embodiments, the spatial location may be determined at a time corresponding to the reference feature changing from a first state to a second state. The spatial location of the first augmented reality element 808 may be determined as a location within a grid defined for the graphical user interface, a pixel position or position corresponding to a set of pixels depicting the first augmented reality element, a set of coordinates for the first augmented reality element 808 or a point on or within the first augmented reality element 808, or any other suitable definable spatial location within the graphical user interface 800.

In some embodiments, the spatial location of the first augmented reality element is determined relative to the reference feature or the facial location of the reference feature. For example, the spatial location of the first augmented reality element may be determined as a measure of distance from a portion of the reference feature, a number of pixels between the first augmented reality element and the reference feature, or any other suitable relative location or measurement. In some instances, the augmentation component 230 may determine the spatial location of the first augmented reality element based on or in response to movement of the first augmented reality element.

For example, as shown in FIG. 8, the first augmented reality element 808 is depicted in a first position. The augmentation component 230 and the movement component 240 may detect movement of the first augmented reality element 808 by comparing a position of the face (e.g., the object of interest 802) in two or more frames of the video stream. In detecting the movement of the object of interest 802, the movement component 240 or the augmentation component 230 may determine a first position for the reference feature 806 in a first frame (e.g., FIG. 8), a set of landmarks, a set of edges, or any other distinguishing aspect of the object of interest 802 or the reference feature 806. The movement component 240 may then determine or detect a second position for the object of interest 802 or the reference feature 806 in a second frame (e.g., FIG. 9). Where the first position and the second position differ, the movement component 240 may detect movement of the object of interest 802 or the reference feature 806.

In some embodiments, the movement component 240 determines movement by detecting an average position for the object of interest 802 or the reference feature 806 for a plurality of frames (e.g., successive or consecutive frames, or non-consecutive frames). In response to movement detected for the object of interest 802, the augmentation component 230 may detect the spatial position of the first augmented reality element 808. In some instances, the spatial position may be identified as a location, a location or distance relative to the object of interest 802 or a point on the object of interest 802.

In some embodiments where the movement component 240 detects movement of the reference feature 806, the movement component 240 identifies a first state of the reference feature 806. The first state may correspond to a first position or first positions of a set of landmark points corresponding to the reference feature. For example, where the reference feature is a mouth depicted on the face of the user, the movement component 240 may detect a first state of the mouth at a first frame. The first state may correspond to positions of one or more pixels, landmarks (e.g., oral commissures, vermillion border, cupid's bow, philtrum, philtral ridge, or other points), or other discernable aspects of the mouth in the first frame. The movement component may then detect the second state of the mouth at the second frame by comparing the positions described above determined for the first frame with positions of the same aspects or characteristics in the second frame.

In operation 730, the augmentation component 230 determines a proximity of the spatial location to the facial location as being within a proximity threshold. In some instances, the proximity threshold is a distance from at least a portion of the object of interest or the reference feature. The proximity threshold may be defined as a distance from the object of interest or the reference feature, which places at least a portion of the first augmented reality element as overlapping or crossing an edge or boundary of the reference feature or the object of interest. For example, as shown in FIGS. 8-10, the first augmented reality element 808 may be determined to be within the proximity threshold when the first augmented reality element moves from the first position, shown in FIG. 8, to a subsequent position, shown in FIG. 10 which overlaps a portion of the reference feature 806.

After identifying the first state, as described above with respect to operation 720, the movement component 240 determines a change of the reference feature 806. The change of the reference feature 806 may be a change from the first state to a second state corresponding to a second position or second positions of at least one landmark point of the set of landmarks points. As referenced above, the second position of the at least one landmark point may be a position of the at least one landmark point in a second frame of the video stream. The movement component 240 may detect movements of the object of interest 802, the reference feature 806, or landmarks of one or both of the object of interest and the reference feature using any suitable motion tracking, face tracking, or object tracking operations.

Figure 9:
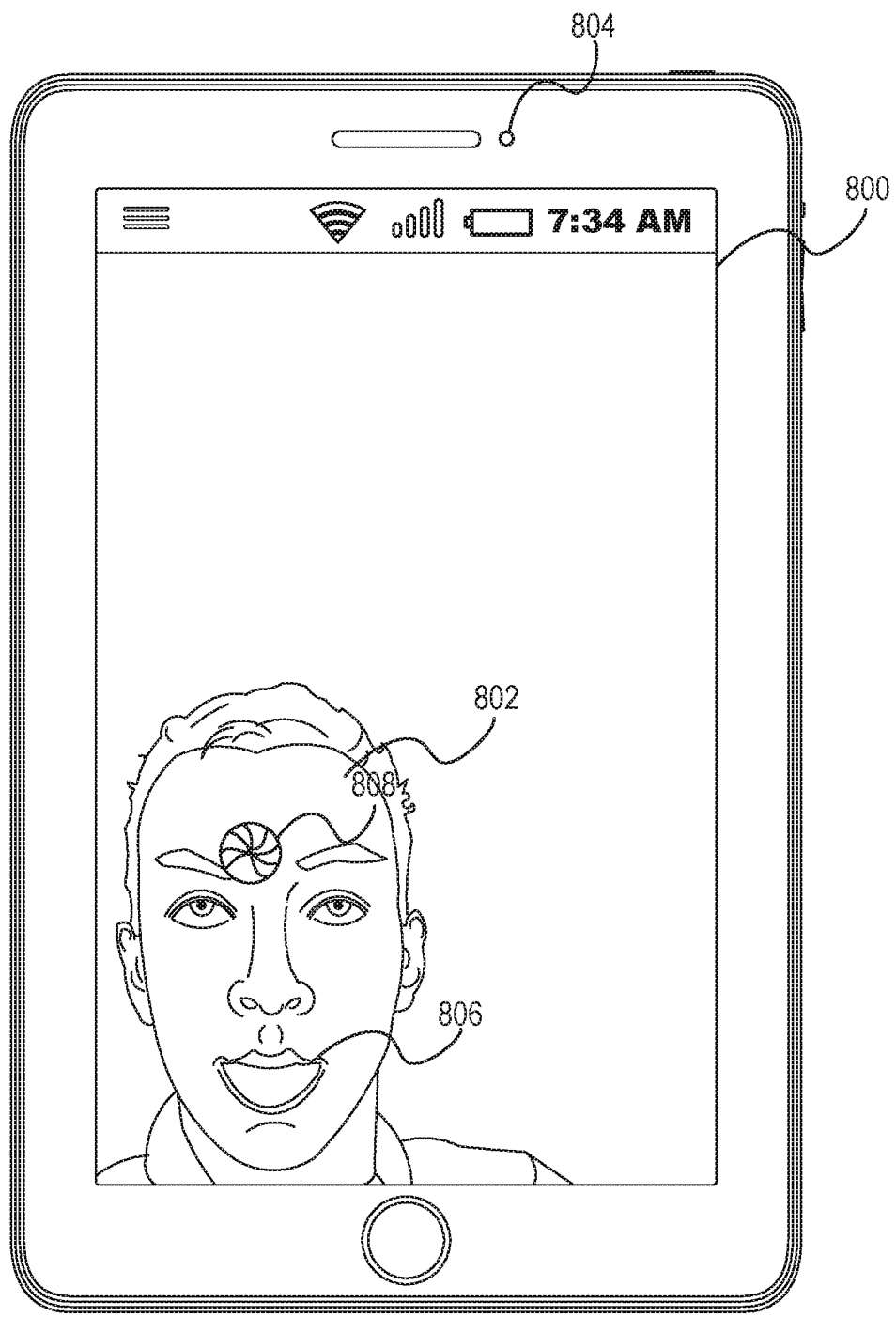
FIG. 9 is a user interface diagram depicting control of a user interface with an object depicted within the user interface, according to some example embodiments.
Figure 10:
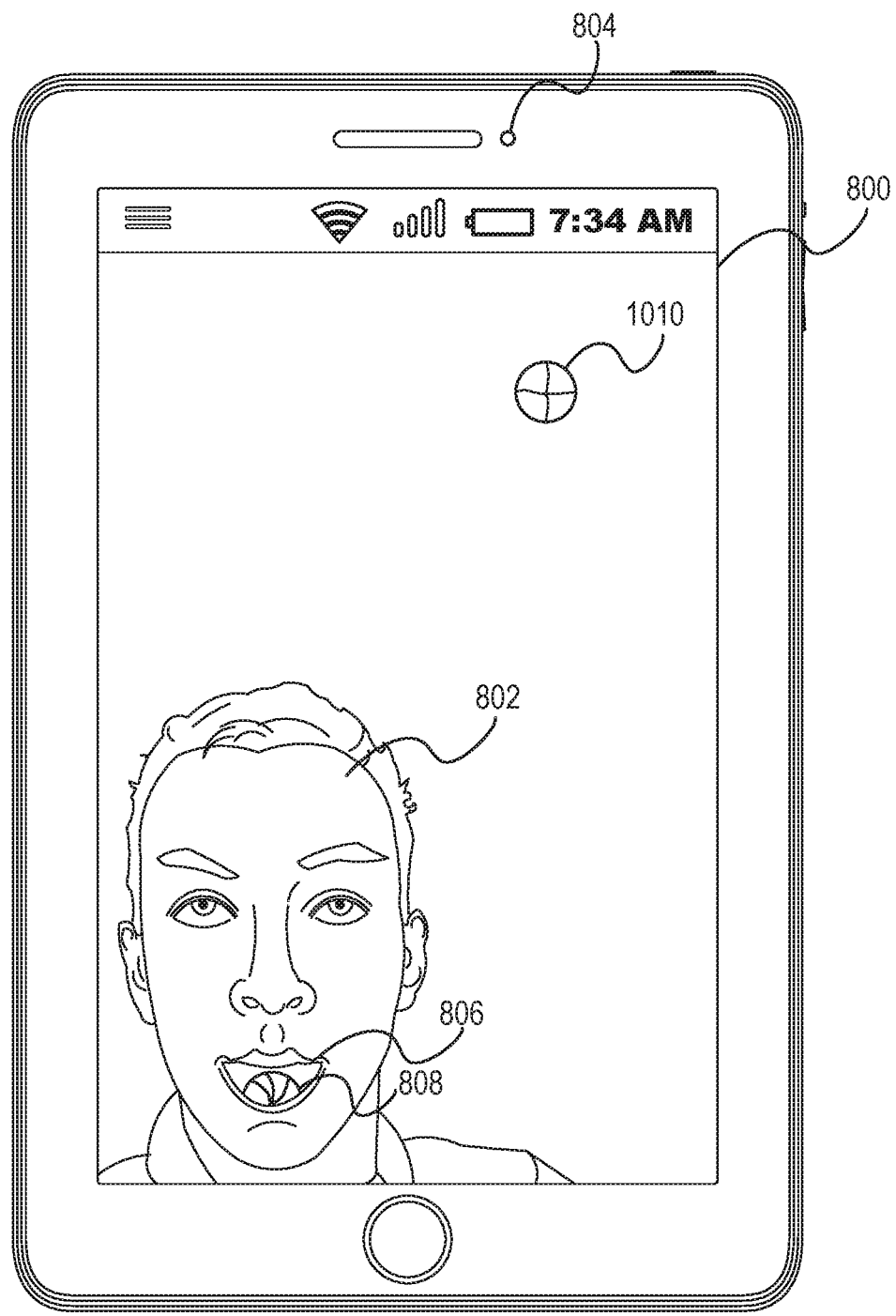
FIG. 10 is a user interface diagram depicting control of a user interface with an object depicted within the user interface, according to some example embodiments.

For example, where the object of interest 802 is a face and the reference feature 806 is a mouth as shown in FIGS. 8-10, the movement component 240 may determine the first state of the mouth as an open state, such that the mouth is open to a degree detectable by the movement component 240, the recognition component 220, or the augmentation component 230. In some instances, the open state may be determined as the mouth being open beyond a predetermined threshold. The opening of the mouth may be determined based on an amount of black or darkened pixels present within a selected area of the graphical user interface. The selected area being an area bounded by one or more of the mouth or a bounding box incorporating the area of the face associated with the mouth. The opening of the mouth may also be determined based on distances between one or more facial landmark points of the mouth or located proximate thereto. The second state may be a closed state of the mouth. In such embodiments, the reference feature 806 (e.g., the mouth) changing from the first state to the second state may be a representation of the mouth moving from an open position to a closed position or toward a closed position.

In some embodiments, the proximity of the spatial location is determined in response to movement of the object of interest 802. The movement component 240 may detect movement by continuously tracking the object of interest 802, the reference feature 806, or landmarks of one or both of the object of interest 802 and the reference feature 806. The movement component 240 may also detect movement by periodically determining positions of one or more of the object of interest 802, the reference feature 806, or one or more of the landmarks. When periodically determining positions, the movement component 240 may select a set of frames (e.g., reference frames) from which to determine the positions. The set of reference frames may be selected based on a predetermined frame interval, a quality of the frame (e.g., a focus quality, a presence of a specified landmark or landmarks, or any other quality metric), a frame average (e.g., one or more averaged aspects, features, or qualities of a subset of frames), or any other suitable selection metric. Upon selection or determination of a reference frame, the movement component 240 may determine the position of the object of interest 802, the reference feature, portions thereof, or the at least one landmark within the reference frame and compare the detected position with one or more previously detected positions in a previous reference frame. After determining movement of the object of interest 802, the augmentation component 230 may determine the spatial location of the first augmented reality element 808 to the facial location of the object of interest 802.

In operation 740, the augmentation component 230 modifies presentation of the first augmented reality element 808 in response to detecting movement of the reference feature 806 changing from the first state to the second state. In some instances, the augmentation component 230 modifies the presentation of the first augmented reality element 808 based on the proximity of the spatial location to the facial location, as discussed above. The augmentation component 230 may modify the presentation of the first augmented reality element 808 by performing one or more operations or sub-operations upon detecting the change in state of the reference feature 806. For example, the augmentation component 230 may iteratively or progressively obscure or remove portions of the first augmented reality element 808, change one or more colors of the first augmented reality element 808, change a size of the first augmented reality element 808, or any other suitable modification.

As noted above, in some embodiments the augmentation component 230 determines the first augmented reality element 806, at the spatial location, obscures at least a portion of the reference feature 806 (e.g., a mouth). The portion of the reference feature 806 obscured by the first augmented reality element 808 may be positioned within an interior area of the reference feature 806. For example, where the reference feature 806 is a mouth, the interior area of the mouth may be a darkened area within the graphical user interface representing the mouth in an open state and bounded by pixels representing lips or other portions of the mouth. As such, the interior area may be understood as an interior surface of the reference feature 806, in some instances.

In response to the first augmented reality element 808 obscuring the portion of the reference feature 806, the augmentation component 230 may modify presentation of the first augmented reality element 808 for a period of time prior to terminating presentation of the first augmented reality element 808. For example, where the reference feature 806 is a mouth and the first augmented reality element 808 is a piece of candy obscuring a portion of an opening of the mouth, the augmentation component 230 may gradually modify presentation of the first augmented reality element 808 (e.g., gradually changing one or more colors, gradually reducing a size, or other progressive or iterative presentation modifications) to depict the candy falling into the open mouth. After the period of time is elapsed, a position change of the first augmented reality element 808, or any other suitable trigger, the augmentation component 230 may terminate presentation of the first augmented reality element 808.

For example, as shown in FIG. 10, the augmentation component 230 may modify presentation of the first augmented reality element 808, relative to the object of interest 802 or a portion thereof, in one or more frames of the video stream. In FIGS. 8-10, the first augmented reality element 806 is depicted as traveling along a trajectory across a set of frames. The object of interest 802 is detected as moving relative to one or more of the first augmented reality element 806 and points within the graphical user interface 800. In FIG. 10, the augmentation component 230 modifies presentation of the first augmented reality element 806 in response to the object of interest 802 acting on the first augmented reality element 806. As shown, one or more of the components of the augmented reality system 160 may detect a proximity of a portion of the object of interest 802 (e.g., the mouth) relative to the first augmented reality element 806. When the mouth is within a specified proximity of the first augmented reality element 806 or the first augmented reality element 806 obstructs at least a portion of the mouth, the augmentation component 230 may modify presentation of the first augmented reality element 806 by changing one or more of a color and a size of the first augmented reality element 806. The augmentation component 230 may modify the color by darkening the first augmented reality element 806 or change the size by reducing one or more dimensions of the first augmented reality element 806, such that the first augmented reality element 806 is depicted is disappearing within the mouth of the object of interest 802 in FIG. 10 or thereafter.

In operation 750, the augmentation component 230 causes presentation of at least one second augmented reality element within the graphical user interface along with the object of interest (e.g., the face). In some embodiments, the augmentation component 230 causes presentation of the at least one second augmented reality element based on the proximity determined in operation 730. The augmentation component 230 may cause presentation of the at least one second augmented reality element based on the proximity of operation 730 and in response to the reference feature changing 806 from the first state to the second state.

In some embodiments, the at least one second augmented reality element may be presented within the graphical user interface spaced a distance apart from the face and the reference feature. The at least one second augmented reality element may be presented as traveling or moving along a trajectory toward the object of interest or the reference feature. For example, as shown in FIG. 10, while modifying the first augmented reality element 806 or after the modification, the augmentation component 230 may cause presentation of a second augmented reality element 1010. In some embodiments, the second augmented reality element 1010 may be initially presented in a manner similar to that of the first augmented reality element 806. The second augmented reality element 1010 may initially occupy a distinct position as the first augmented reality element 806. In some embodiments, the second augmented reality element 808 is presented as traveling along a trajectory or path within the graphical user interface 800. The trajectory or path may be similar to or distinct from the trajectory or path of the first augmented reality element 806. For example, as shown in FIG. 10, the second augmented reality element 1010 may be presented as falling along a similar trajectory or direction as the first augmented reality element 806, but initially positioned in a different portion of the graphical user interface 800.

In some embodiments, in addition to modifying presentation of the first augmented reality element, the augmentation component 230 modifies presentation of the object of interest. For example, where the object of interest is a face, the augmentation component 230 may modify a depiction of the face within the graphical user interface to generate a modified face. In some instances, modification of the face may be performed responsive to the movement of the portion of the face and modifying presentation of the first augmented reality element. The augmentation component 230 may cause presentation of the modified face contemporaneous with presentation of one or more of the first augmented reality element and at least one second augmented reality element.

Figure 11:
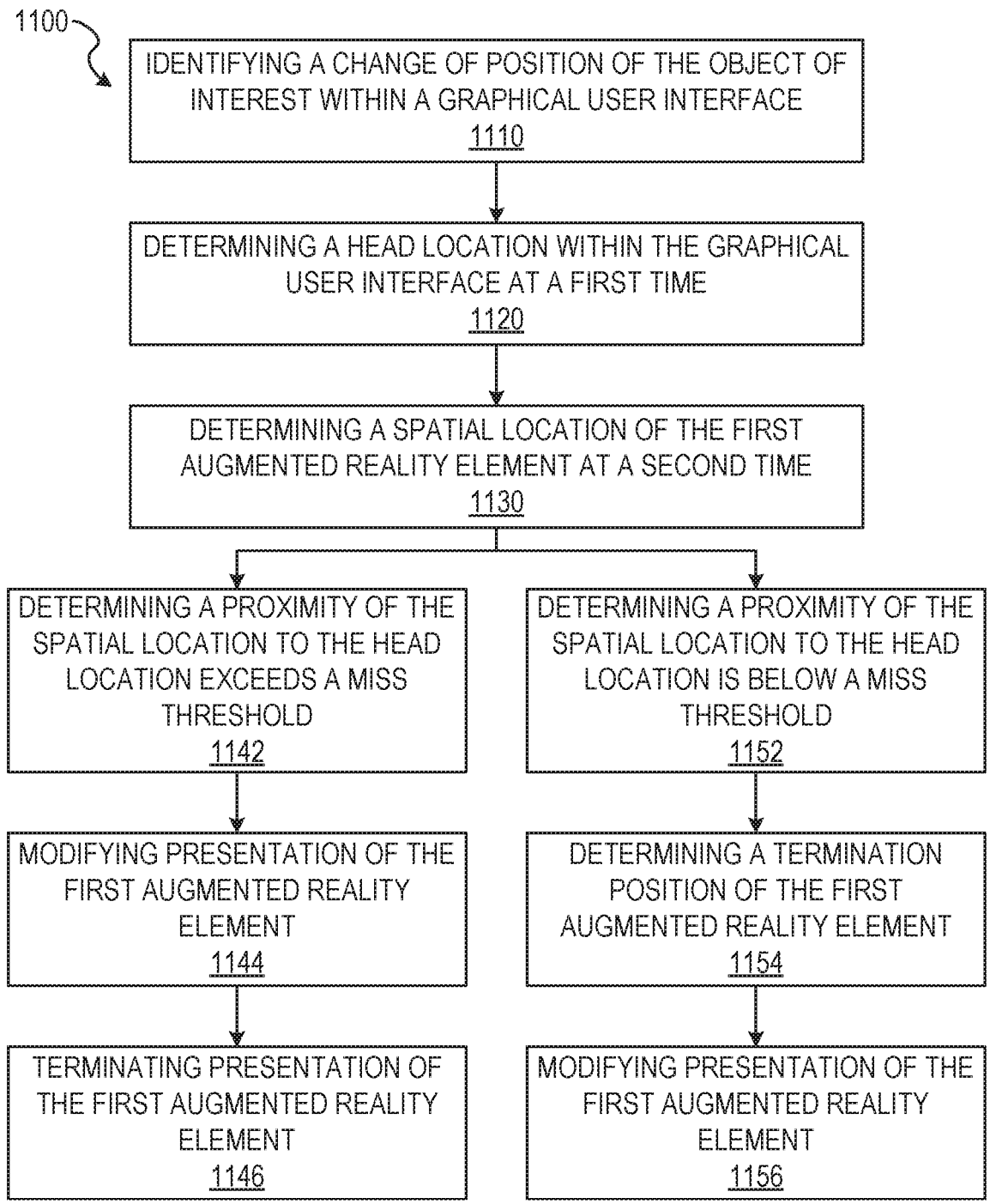
FIG. 11 is a flow diagram illustrating an example method for controlling a user interface with an object depicted within the user interface, according to some example embodiments.

FIG. 11 depicts a flow diagram illustrating an example method 1100 for controlling a user interface with an object depicted the user interface, according to some example embodiments. The operations of method 1100 may be performed by components of the augmented reality system 160. In some instances, certain operations of the method 1100 may be performed using one or more operations of the method 300 or the method 700 or as sub-operations of one or more operations of the method 300 or the method 700, as will be explained in more detail below. For example, in some embodiments, one or more operations of the method 1100 may be performed as part of operation 340, as sub-operations of operation 340, or in response to operation 340, described above with respect to FIG. 3.

In operation 1110, the movement component 240 identifies a change of position of the object of interest within the graphical user interface or within the field of view of the image capture component of the client device 110. The change of position may be a change from a first position to a second position. The movement component 240 may identify the change of position in a manner similar to or the same as described above with respect to operation 340. The movement component 240 may identify or detect one or more points on the object of interest within a first frame of the video stream to identify the first position. In a subsequent frame, the movement component 240 may identify the one or more points on the object of interest and compare the positions of the points in the first frame and the subsequent frame to determine a change in position.

In operation 1120, the movement component 240 determines an object location of the object of interest within the graphical user interface at a first time or in a first reference frame. In embodiments where the object of interest is a face, the movement component 240 may determine a head location within the graphical user interface at the first time. The object location may encompass at least a portion of the graphical user interface surrounding the object of interest.

In operation 1130, the movement component 240 determines a spatial location of the first augmented reality element at a second time. In some embodiments, the movement component 240 determines the spatial location of the first augmented reality element in a manner similar to or the same as described above with reference to operations 720 and 730. In determining the spatial location of the first augmented reality element, the movement component 240 or the augmentation component 230 determines a position of at least one point, feature, or aspect of the first augmented reality element within the graphical user interface depicted on the display component of the client device 110.

In operation 1142, the augmentation component 230 determines a proximity of the spatial location, at the second time, relative to the object location. The augmentation component 230 may determine the proximity of the spatial location, relative to the object location, exceeds a miss threshold. In some embodiments, the augmentation component 230 compares the spatial location to the object location. The augmentation component 230 may compare the locations using one or more values, coordinates, or other suitable numerical representations of the spatial location and the object location.

In some embodiments, the augmentation component 230 may determine the proximity exceeds a miss threshold by comparing a difference, identified between values for the spatial location and the object location, with the miss threshold. Where a value for the miss threshold is smaller than a value for the difference between the spatial location and the object location, the augmentation component 230 may identify the spatial location as a miss. The augmentation component 230 may also determine the proximity exceeds the miss threshold by identifying a buffer surrounding the spatial location for the first augmented reality element and a buffer surrounding the object location for the object of interest. The augmentation component 230 may determine a value for a difference between an edge of the buffer for the first augmented reality element and the buffer for the object of interest is larger than the value for the miss threshold. Although described with references to specified embodiments, the augmentation component 230 may determine the proximity exceeds the miss threshold by any suitable method.

In operation 1144, the augmentation component 230 modifies presentation of the first augmented reality element by modifying one or more of a size, a color, and a position of the first augmented reality element over a period of time. In some embodiments, the augmentation component 230 modifies the first augmented reality element in a manner similar to or the same as described above with respect to FIGS. 6 and 10. The augmentation component 230 may modify any suitable aspect, characteristic, or value for the first augmented reality element corresponding to one or more of the miss threshold, the position of the object of interest, a theme of a game, or any other suitable configuration.

In operation 1146, the augmentation component 230 terminates presentation of the first augmented reality element after modifying presentation of the first augmented reality element. In some embodiments, the augmentation component 230 terminates presentation of the first augmented reality element prior to causing presentation of the at least one second augmented reality element. The augmentation component 230 may terminate presentation of the first augmented reality element a specified or predetermined amount of time after modification of the first augmented reality element. In some instances, the augmentation component 230 terminates presentation of the first augmented reality element based on one or more aspect of modifying the first augmented reality element. For example, where the first augmented reality element flies past a shoulder of the user or the object of interest, the augmentation component 230 may terminate presentation of the first augmented reality element after modifying a size and color of the first augmented reality element to depict the first augmented reality element as passing a horizon, a specified distance past the object of interest, or any other suitable effect.

In operation 1152, the augmentation component 230 determines a proximity of the spatial location, at the second time, relative to the object location is below a miss threshold. In some embodiments, the augmentation component 230 may determine the proximity is below a miss threshold in a manner similar to or the same as described above with respect to operation 1142. In determining the proximity of the spatial location and the object location, the augmentation component 230 may compare a value for the spatial location and a value for the object location. A value representing a difference between the spatial location and the object location may be determined as being less than or otherwise below the miss threshold.

In operation 1154, the augmentation component 230 determines a termination position of the first augmented reality element at a third time. In some embodiments, the termination position is within a boundary of the object of interest. In some embodiments, the augmentation component 230 determines the termination position of the first augmented reality element based on a trajectory of the first augmented reality element. The augmentation component 230 may also determine the termination position of the first augmented reality element based on the trajectory of the first augmented reality element and a position of the object of interest (e.g., the object location). For example, where the first augmented reality element will impact or hit the object of interest, based on a value being below the miss threshold, the augmentation component 230 may determine a position at which the first augmented reality element will impact the object of interest, such as a face, a neck, or a shoulder. In some embodiments, the augmentation component 230 uses one or more of a vertical position, a horizontal position, and a depth position of the object of interest to determine the termination point. The augmentation component 230 may also determine a termination time (e.g., the third time) at which the first augmented reality element will impact the object of interest based on one or more of the trajectory of the first augmented reality element, a velocity of the first augmented reality element, the position of the object of interest, and any other suitable information.

In operation 1156, the augmentation component 230 modifies presentation of the first augmented reality element by modifying the first augmented reality element from a first state to a second state. The second state of the first augmented reality element may remain at the termination position on the object of interest for a period of time. In some instances, the first state comprises a depiction of the first augmented reality element as presented in previous operations described herein. The second state may represent the first augmented reality element responsive to a simulated impact of the first augmented reality element with the object of interest. For example, where the first augmented reality element is a graphical representation of a tomato, the first state may depict the tomato as whole and undamaged. The second state may depict the tomato as crushed, bruised, or otherwise deformed responsive to the impact of the first augmented reality element with the object of interest. In this example, the first augmented reality element, depicted in the second state (e.g., a splattered tomato) may be presented within the graphical user interface for a predetermined period of time (e.g., one to five seconds), for a period of time as the first augmented reality element moves (e.g., the splattered tomato sliding down a face of the user), or any other suitable time period.

Figure 12:
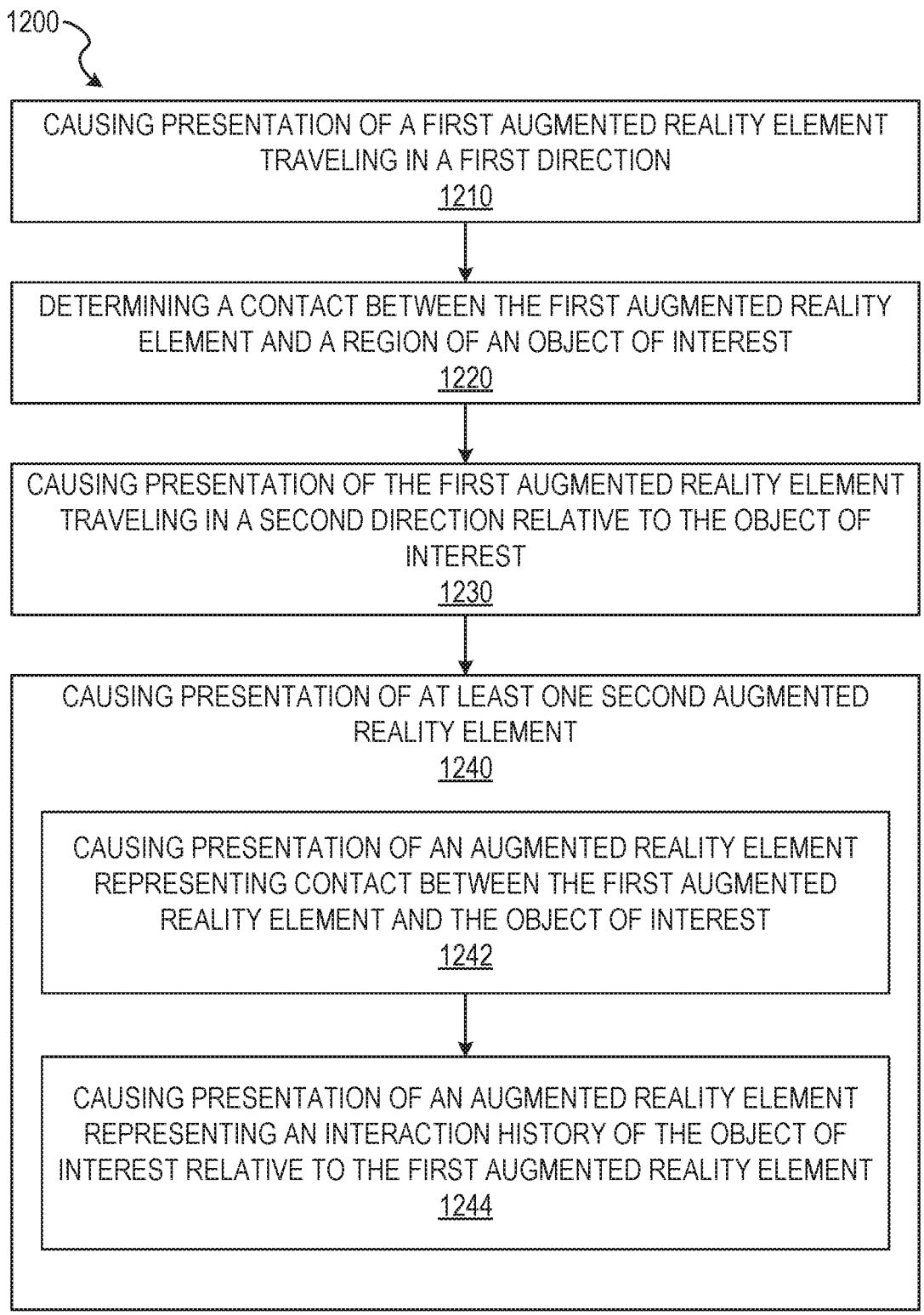
FIG. 12 is a flow diagram illustrating an example method for controlling a user interface with an object depicted within the user interface, according to some example embodiments.

FIG. 12 depicts a flow diagram illustrating an example method 1200 for controlling a user interface with an object depicted the user interface, according to some example embodiments. The operations of method 1200 may be performed by components of the augmented reality system 160. In some instances, certain operations of the method 1200 may be performed using one or more operations of the methods 300, 700, or 900 or as sub-operations of one or more operations of the methods 300, 700, or 900, as will be explained in more detail below. For example, in some embodiments, one or more operations of the method 1200 may be performed as part of operation 350, as sub-operations of operation 350, or in response to operation 350, described above with respect to FIG. 3.

In operation 1210, the augmentation component 230 causes presentation of the first augmented reality element traveling in a first direction (e.g., a first trajectory) relative to the object of interest. In some embodiments, the augmentation component 230 presents the first augmented reality element in a manner similar to or the same as described above with respect to FIGS. 3 and 8. The augmentation component 230 may initially present the first augmented reality element at a first position within the graphical user interface. The augmented reality element may iteratively or continually change the position of the first augmented reality element at an interval, rate, or other scheme to depict the first augmented reality element as moving within the graphical user interface, along a travel path or trajectory and at a selected velocity or speed.

In operation 1220, one or more of the augmentation component 230 and the movement component 240 determine a contact between the first augmented reality element and a region of the object of interest. In some embodiments, the contact may be determined in response to movement of a portion of the object of interest. In some embodiments, the augmentation component 230 may determine the contact in a manner similar to or the same as described above with respect to operation 1152. In such embodiments, the augmentation component 230 may determine the contact based on a point of the first augmented reality element and a point of the object of interest being within a specified proximity. In some embodiments, the augmentation component 230 determines the contact by identifying a first edge of the first augmented reality element and a second edge of the object of interest. For example, the first edge and the second edge may be identified pixel barriers, generated outlines, or any other suitably defined intersection between the first augmented reality element and the object of interest, respectively, and another aspect depicted within the graphical user interface. The augmentation component 230 may determine the contact by identifying a location and a time at which a portion of the first edge and a portion of the second edge are to be rendered at the same location, coordinate, pixel, or other defined location.

In operation 1230, the augmentation component 230 causes presentation of the first augmented reality element traveling in a second direction relative to the object of interest. In some embodiments, the augmentation component 230 modifies the trajectory (e.g., travel in the first direction to travel in the second direction) in response to the contact determined in operation 1220. For example, where the first augmented reality element is depicted as a ball and the object of interest is a face, the augmentation component 230 may modify the trajectory of the ball based on a simulated contact of the ball and the face (e.g., heading a ball). In some embodiments, the augmentation component 230 modifies the trajectory by changing one or more angle of the trajectory (e.g., bouncing off at an angle relative to the initial travel path). The augmentation component 230 may also modify the trajectory by depicting the first augmented reality element as traveling along the same travel path as in operation 1210 in a direction opposite of the initial direction of the travel path (e.g., reversing course).

In operation 1240, the augmentation component 230 causes presentation of at least one second augmented reality element. The at least one second augmented reality element may be similar to the first augmented reality element (e.g., an additional ball, tomato, or candy) or may be distinct from the first augmented reality element. For example, the at least one second augmented reality element may be a celebratory graphic, a point total, a point accumulation, a score, a word, an effect (e.g., a firework burst, a flame, snowflakes, etc.), or any other suitable graphical element within the graphical user interface and within the video stream.

In some embodiments operation 1240 comprises one or more sub-operations. For example, in operation 1242, the augmentation component 230 causes presentation of an augmented reality element representing the contact between the first augmented reality element and the region of the object of interest. In such embodiments, the augmented reality element, representing the contact, may be a graphical representation of the contact. In such instances, the augmented reality element may be temporary or transitory, appearing for a brief period of time and then ceasing presentation. For example, the augmented reality element representing the contact may be a set of lines indicating an impact, a word (e.g., an onomatopoeia such as "bonk"), or any other suitable representation.

In operation 1244, the augmentation component 230 causes presentation of an augmented reality element representing an interaction history of the face relative to the first augmented reality element. In some embodiments, the augmentation component 230 generates an effect on the object of interest, such as simulated damage, bruising, blood, swelling, transferred paint, scratching, dents, or other representation of the interaction history. The augmented reality element representing the interaction history may be persistent for a duration of a use session. In some instances, the augmented reality element representing the interaction history is presented for a predetermined or dynamic period of time. Where the period of time is dynamic, the period of time may be based on a length of interaction history (e.g., an amount of time a session has been active), a characteristic of the first augmented reality element (e.g., a size, a shape, a hardness, or other aspect of the element), a number of interactions of the object of interest with the first augmented reality element, or any other suitable aspect or characteristic of one or more of the first augmented reality element, the object of interest, and a user session.

Modules, Components, and Logic

Certain embodiments are described herein as including logic or a number of components, modules, or mechanisms. Components can constitute hardware components. A "hardware component" is a tangible unit capable of performing certain operations and can be configured or arranged in a certain physical manner. In various example embodiments, computer systems (e.g., a standalone computer system, a client computer system, or a server computer system) or hardware components of a computer system (e.g., at least one hardware processor, a processor, or a group of processors) is configured by software (e.g., an application or application portion) as a hardware component that operates to perform certain operations as described herein.

In some embodiments, a hardware component is implemented mechanically, electronically, or any suitable combination thereof. For example, a hardware component can include dedicated circuitry or logic that is permanently configured to perform certain operations. For example, a hardware component can be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component can include software encompassed within a general-purpose processor or other programmable processor. It will be appreciated that the decision to implement a hardware component mechanically, in dedicated and permanently configured circuitry, or in temporarily configured circuitry (e.g., configured by software) can be driven by cost and time considerations.

Accordingly, the phrase "hardware component" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software can accordingly configure a particular processor or processors, for example, to constitute a particular hardware component at one instance of time and to constitute a different hardware component at a different instance of time.

Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component performs an operation and stores the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented components that operate to perform operations or functions described herein. As used herein, "processor-implemented component" refers to a hardware component implemented using processors.

Similarly, the methods described herein can be at least partially processor-implemented, with a particular processor or processors being an example of hardware. For example, at least some of the operations of a method can be performed by processors or processor-implemented components. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an Application Program Interface (API)).

The performance of certain of the operations may be distributed among the processors, not only residing within a single machine, but deployed across a number of machines. In some example embodiments, the processors or processor-implemented components are located in a single geographic location (e.g., within a home environment, an office environment, or a server farm). In other example embodiments, the processors or processor-implemented components are distributed across a number of geographic locations.

Applications

Figure 13:
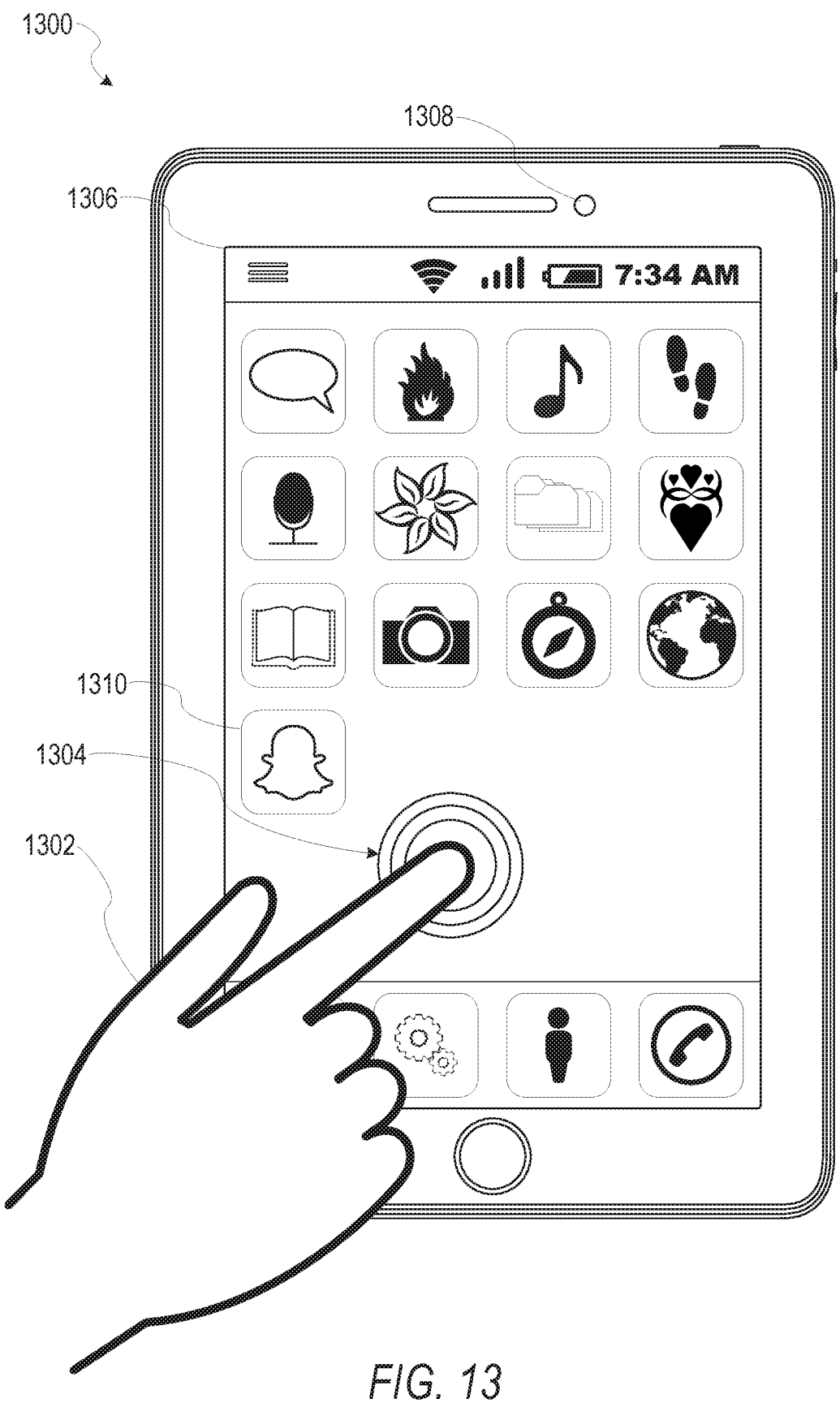
FIG. 13 is a user interface diagram depicting an example mobile device and mobile operating system interface, according to some example embodiments.

FIG. 13 illustrates an example mobile device 1300 executing a mobile operating system (e.g., IOS™, ANDROID™, WINDOWS® Phone, or other mobile operating systems), consistent with some embodiments. In one embodiment, the mobile device 1300 includes a touch screen operable to receive tactile data from a user 1302. For instance, the user 1302 may physically touch 1304 the mobile device 1300, and in response to the touch 1304, the mobile device 1300 may determine tactile data such as touch location, touch force, or gesture motion. In various example embodiments, the mobile device 1300 displays a home screen 1306 (e.g., Springboard on IOS™) operable to launch applications or otherwise manage various aspects of the mobile device 1300. In some example embodiments, the home screen 1306 provides status information such as battery life, connectivity, or other hardware statuses. The user 1302 can activate user interface elements by touching an area occupied by a respective user interface element. In this manner, the user 1302 interacts with the applications of the mobile device 1300. For example, touching the area occupied by a particular icon included in the home screen 1306 causes launching of an application corresponding to the particular icon.

The mobile device 1300, as shown in FIG. 13, includes an imaging device 1308. The imaging device 1308 may be a camera or any other device coupled to the mobile device 1300 capable of capturing a video stream or one or more successive images. The imaging device 1308 may be triggered by the augmented reality system 160 or a selectable user interface element to initiate capture of a video stream or succession of images and pass the video stream or succession of images to the augmented reality system 160 for processing according to the one or more methods described in the present disclosure.

Many varieties of applications (also referred to as "apps") can be executing on the mobile device 1300, such as native applications (e.g., applications programmed in Objective-C, Swift, or another suitable language running on IOS™, or applications programmed in Java running on ANDROID™), mobile web applications (e.g., applications written in Hyper-text Markup Language-5 (HTML5)), or hybrid applications (e.g., a native shell application that launches an session). For example, the mobile device 1300 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 1300 includes a social messaging app 1310 such as SNAPCHAT® that, consistent with some embodiments, allows users to exchange ephemeral messages that include media content. In this example, the social messaging app 1310 can incorporate aspects of embodiments described herein. For example, in some embodiments the social messaging application includes an ephemeral gallery of media created by users the social messaging application. These galleries may consist of videos or pictures posted by a user and made viewable by contacts "friends") of the user. Alternatively, public galleries may be created by administrators of the social messaging application consisting of media from any users of the application (and accessible by all users), In yet another embodiment, the social messaging application may include a "magazine" feature which consists of articles and other content generated by publishers on the social messaging application's platform and accessible by any users. Any of these environments or platforms may be used to implement concepts of the present inventive subject matter.

In some embodiments, an ephemeral message system may include messages having ephemeral video clips or images which are deleted following a deletion trigger event such as a viewing time or viewing completion. In such embodiments, a device implementing the augmented reality system 160 may allow control of a graphical user interface, or elements depicted therein, with an object captured by an image capture device and presented within the graphical user interface at the time of control interaction. The augmented reality system 160 may enable control of the graphical user interface while generating the ephemeral message, and enable transmission of the ephemeral message to another device using the ephemeral message system.

Software Architecture

Figure 14:
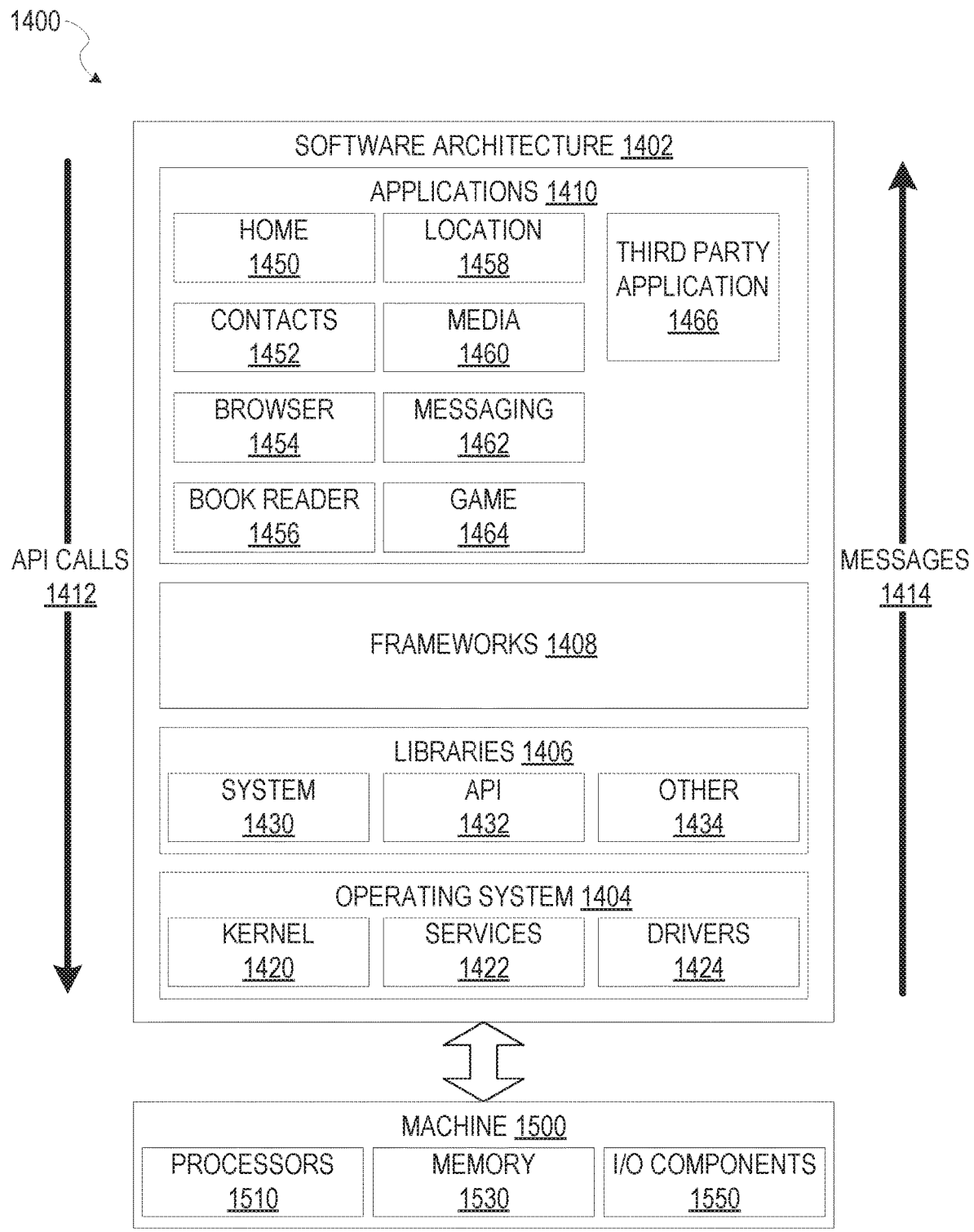
FIG. 14 is a block diagram illustrating an example of a software architecture that may be installed on a machine, according to some example embodiments.

FIG. 14 is a block diagram 1400 illustrating an architecture of software 1402, which can be installed on the devices described above. FIG. 14 is merely a non-limiting example of a software architecture, and it will be appreciated that many other architectures can be implemented to facilitate the functionality described herein. In various embodiments, the software 1402 is implemented by hardware such as machine a 1500 of FIG. 15 that includes processors 1510, memory 1530, and I/O components 1550. In this example architecture, the software 1402 can be conceptualized as a stack of layers where each layer may provide a particular functionality. For example, the software 1402 includes layers such as an operating system 1404, libraries 1406, frameworks 1408, and applications 1410. Operationally, the applications 1410 invoke application programming interface (API) calls 1412 through the software stack and receive messages 1414 in response to the API calls 1412, consistent with some embodiments.

In various implementations, the operating system 1404 manages hardware resources and provides common services. The operating system 1404 includes, for example, a kernel 1420, services 1422, and drivers 1424. The kernel 1420 acts as an abstraction layer between the hardware and the other software layers consistent with some embodiments. For example, the kernel 1420 provides memory management, processor management (e.g., scheduling), component management, networking, and security settings, among other functionality. The services 1422 can provide other common services for the other software layers. The drivers 1424 are responsible for controlling or interfacing with the underlying hardware, according to some embodiments. For instance, the drivers 1424 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1406 provide a low-level common infrastructure utilized by the applications 1410. The libraries 1406 can include system libraries 1430 (e.g., C standard library) that can provide functions such as memory allocation functions, string manipulation functions, mathematic functions, and the like. In addition, the libraries 1406 can include API libraries 1432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries SQLite to provide various relational database functions), web libraries (e.g., WebKit to provide web browsing functionality), and the like. The libraries 1406 can also include a wide variety of other libraries 1434 to provide many other APIs to the applications 1410.

The frameworks 1408 provide a high-level common infrastructure that can be utilized by the applications 1410, according to some embodiments. For example, the frameworks 1408 provide various graphic user interface (GUI) functions, high-level resource management, high-level location services, and so forth. The frameworks 1408 can provide a broad spectrum of other APIs that can be utilized by the applications 1410, some of which may be specific to a particular operating system or platform.

In an example embodiment, the applications 1410 include a home application 1450, a contacts application 1452, a browser application 1454, a book reader application 1456, a location application 1458, a media application 1460, a messaging application 1462, a game application 1464, and a broad assortment of other applications such as a third party application 1466. According to some embodiments, the applications 1410 are programs that execute functions defined in the programs. Various programming languages can be employed to create the applications 1410, structured in a variety of manners, such as object-oriented programming languages (e.g., Objective-C, Java, or C++) or procedural programming languages (e.g., C or assembly language). In a specific example, the third party application 1466 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating systems. In this example, the third party application 1466 can invoke the API calls 1412 provided by the operating system 1404 to facilitate functionality described herein.

Example Machine Architecture and Machine-Readable Medium

Figure 15:
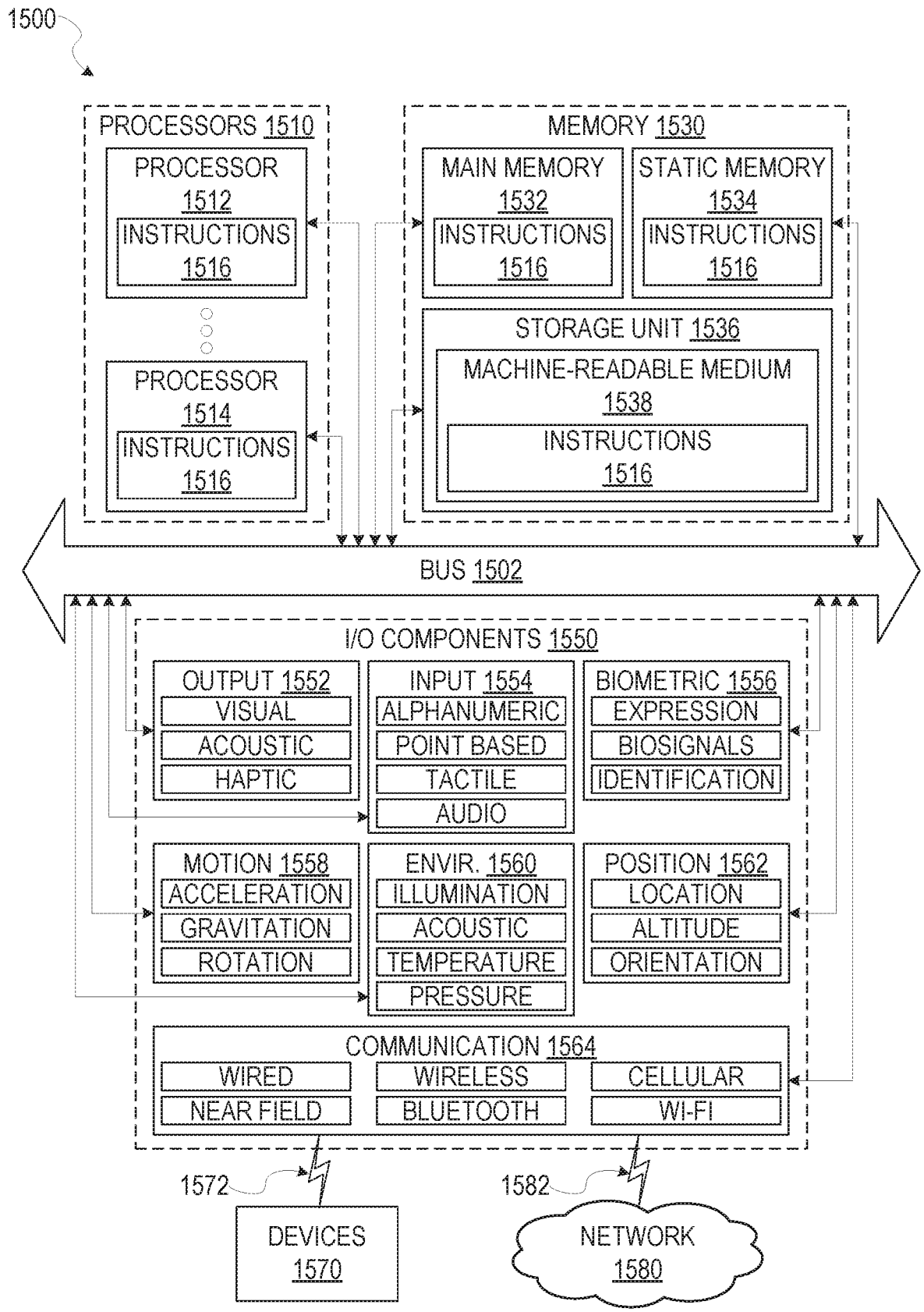
FIG. 15 is a block diagram presenting a diagrammatic representation of a machine in the form of a computer system within which a set of instructions may be executed for causing the machine to perform any of the methodologies discussed herein, according to an example embodiment.

FIG. 15 is a block diagram illustrating components of a machine 1500, according to some embodiments, able to read instructions (e.g., processor executable instructions) from a machine-readable medium (e.g., a non-transitory machine-readable storage medium) and perform any of the methodologies discussed herein. Specifically, FIG. 15 shows a diagrammatic representation of the machine 1500 in the example form of a computer system, within which instructions 1516 (e.g., software, a program, an application, an applet, an app, or other executable code) for causing the machine 1500 to perform any of the methodologies discussed herein can be executed. In alternative embodiments, the machine 1500 operates as a standalone device or can be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1516, sequentially or otherwise, that specify actions to be taken by the machine 1500. Further, while only a single machine 1500 is illustrated, the term "machine" shall also be taken to include a collection of machines 1500 that individually or jointly execute the instructions 1516 to perform any of the methodologies discussed herein.

In various embodiments, the machine 1500 comprises processors 1510, memory 1530, and I/O components 1550, which can be configured to communicate with each other via a bus 1502. In an example embodiment, the processors 1510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) include, for example, a processor 1512 and a processor 1514 that may execute the instructions 1516. The term "processor" is intended to include multi-core processors that may comprise two or more independent processors (also referred to as "cores") that can execute instructions 1516 contemporaneously. Although FIG. 15 shows multiple processors 1510, the machine 1500 may include a single processor with a single core, a single processor with multiple cores (e.g., a multi-core processor), multiple processors with a single core, multiple processors with multiples cores, or any combination thereof.

The memory 1530 comprises a main memory 1532, a static memory 1534, and a storage unit 1536 accessible to the processors 1510 via the bus 1502, according to some embodiments. The storage unit 1536 can include a machine-readable medium 1538 on which are stored the instructions 1516 embodying any of the methodologies or functions described herein. The instructions 1516 can also reside, completely or at least partially, within the main memory 1532, within the static memory 1534, within at least one of the processors 1510 (e.g., within the processor's cache memory), or any suitable combination thereof, during execution thereof by the machine 1500. Accordingly, in various embodiments, the main memory 1532, the static memory 1534, and the processors 1510 are considered machine-readable media 1538.

As used herein, the term "memory" refers to a machine-readable medium 1538 able to store data temporarily or permanently and may be taken to include, but not be limited to, random-access memory (RAM), read-only memory (ROM), buffer memory, flash memory, and cache memory. While the machine-readable medium 1538 is shown in an example embodiment to be a single medium, the term "machine-readable medium" should be taken to include a single medium or multiple media (e.g., a centralized or distributed database, or associated caches and servers) able to store the instructions 1516. The term "machine-readable medium" shall also be taken to include any medium, or combination of multiple media, that is capable of storing instructions (e.g., instructions 1516) for execution by a machine (e.g., machine 1500), such that the instructions, when executed by processors of the machine 1500 (e.g., processors 1510), cause the machine 1500 to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1550 include a wide variety of components to receive input, provide output, produce output, transmit information, exchange information, capture measurements, and so on. In general, it will be appreciated that the I/O components 1550 can include many other components that are not shown in FIG. 15. The I/O components 1550 are grouped according to functionality merely for simplifying the following discussion, and the grouping is in no way limiting. In various example embodiments, the I/O components 1550 include output components 1552 and input components 1554. The output components 1552 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1554 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1550 include biometric components 1556, motion components 1558, environmental components 1560, or position components 1562, among a wide array of other components. For example, the biometric components 1556 include components to detect expressions (e.g., hand expressions, facial expressions, vocal expressions, body gestures, or mouth gestures), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1558 include acceleration sensor components (e.g., accelerometer), gravitation sensor components, rotation sensor components (e.g., gyroscope), and so forth. The environmental components 1560 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1562 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1550 may include communication components 1564 operable to couple the machine 1500 to a network 1580 or devices 1570 via a coupling 1582 and a coupling 1572, respectively. For example, the communication components 1564 include a network interface component or another suitable device to interface with the network 1580. In further examples, communication components 1564 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1570 may be another machine or any of a wide variety of peripheral devices (e.g., a peripheral device coupled via a Universal Serial Bus (USB)).

Moreover, in some embodiments, the communication components 1564 detect identifiers or include components operable to detect identifiers. For example, the communication components 1564 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1564, such as location via Internet Protocol (IP) geo-location, location via WI-FI® signal triangulation, location via detecting a BLU-ETOOTH® or NFC beacon signal that may indicate a particular location, and so forth.

Transmission Medium

In various example embodiments, portions of the network 1580 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1580 or a portion of the network 1580 may include a wireless or cellular network, and the coupling 1582 may be a Code Division Multiple Access (CDMA) connection, a Global System for Mobile communications (GSM) connection, or another type of cellular or wireless coupling. In this example, the coupling 1582 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1516 are transmitted or received over the network 1580 using a transmission medium via a network interface device (e.g., a network interface component included in the communication components 1564) and utilizing any one of a number of well-known transfer protocols (e.g., Hypertext Transfer Protocol (HTTP)). Similarly, in other example embodiments, the instructions 1516 are transmitted or received using a transmission medium via the coupling 1572 (e.g., a peer-to-peer coupling) to the devices 1570. The term "transmission medium" shall be taken to include any intangible medium that is capable of storing, encoding, or carrying the instructions 1516 for execution by the machine 1500, and includes digital or analog communications signals or other intangible media to facilitate communication of such software.

Furthermore, the machine-readable medium 1538 is non-transitory (in other words, not having any transitory signals) in that it does not embody a propagating signal. However, labeling the machine-readable medium 1538 "non-transitory" should not be construed to mean that the medium is incapable of movement; the medium should be considered as being transportable from one physical location to another. Additionally, since the machine-readable medium 1538 is tangible, the medium may be considered to be a machine-readable device.

Language

Throughout this specification, plural instances may implement components, operations, or structures described as a single instance. Although individual operations of methods are illustrated and described as separate operations, individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method, comprising:
   detecting, by one or more processors of a device, a face within a field of view of an image capture component associated with the device;
   presenting, within a graphical user interface, the face and a first augmented reality element;

moving the first augmented reality element relative to the face in the graphical user interface;
detecting, as the first augmented reality element moves, a change in a feature of the face from a first state to a second state;
in response to detecting the change in the feature of the face from the first state to the second state:
   modifying a visual attribute of the first augmented reality element based on a distance between the first augmented reality element and the feature of the face in the graphical user interface; and
   displaying, together with the first augmented reality element, a second augmented reality element having one or more visual characteristics that are similar to the first augmented reality element; and
displaying, together with the face and the second augmented reality element, a result augmented reality element, the result augmented reality element representing an interaction between the face and the first and second augmented reality elements.

2. The method of claim 1, further comprising initiating an augmented reality mode configured to present augmented reality elements within the graphical user interface, wherein the second augmented reality element has a same shape or size as the first augmented reality element.

3. The method of claim 1, wherein the first augmented reality element and the face are depicted within the graphical user interface contemporaneously, wherein the second augmented reality element indicates modification of the first augmented reality element.

4. The method of claim 1, wherein detecting the change comprises detecting a movement of at least a portion of the face relative to the first augmented reality element.

5. The method of claim 4, wherein the movement of the portion of the face is a movement of a reference feature, the method further comprising:
   identifying a first state of the reference feature, the first state corresponding to first positions of a set of landmark points corresponding to the reference feature; and
   determining a change of the reference feature from the first state to a second state corresponding to second positions of at least one landmark point of the set of landmark points.

6. The method of claim 1, further comprising:
determining an on-screen position of the face;
determining a spatial location of the first augmented reality element within the graphical user interface, the spatial location determined at a time the change in the feature is detected;
determining a proximity of the spatial location to the on-screen position of the face as being within a proximity threshold; and
based on the proximity, presenting the second augmented reality element within the graphical user interface along with the face.

7. The method of claim 1, wherein the feature is a mouth, and wherein modifying the visual attribute of the first augmented reality element further comprises:
   determining the first augmented reality element, at a spatial location, obscures at least a portion of the mouth, the portion of the mouth obscured by the first augmented reality element being an interior surface of the mouth;
   in response to the first augmented reality element obscuring the portion of the mouth, modifying presentation of the first augmented reality element for a period of time prior to terminating presentation of the first augmented reality element; and
   causing presentation of the second augmented reality element spaced a distance apart from the face, the second augmented reality element moving along a trajectory toward the face.

8. The method of claim 1 further comprising:
determining the first augmented reality element obscures at least a portion of a mouth of the face, the portion of the mouth obscured by the first augmented reality element being an interior surface of the mouth.

9. The method of claim 8, further comprising:
in response to the first augmented reality element obscuring the portion of the mouth, modifying presentation of the first augmented reality element for a period of time prior to terminating presentation of the first augmented reality element; and
causing presentation of the second augmented reality element spaced a distance apart from the face, the second augmented reality element moving along a trajectory toward the face.

10. The method of claim 1, wherein modifying the visual attribute comprises:
   causing presentation of the first augmented reality element traveling in a first direction relative to the face;
   determining a contact between the first augmented reality element and a region of the face; and
   in response to detecting the contact, causing presentation of the first augmented reality element traveling in a second direction relative to the face.

11. The method of claim 1, further comprising:
   causing presentation of the second augmented reality element representing an interaction history of the face relative to the first augmented reality element.

12. The method of claim 1, wherein the result augmented reality element comprises a score or accumulated points.

13. The method of claim 12, wherein the result augmented reality element comprises a celebration effect when an interaction between the face and the first or second augmented reality element satisfies a goal.

14. The method of claim 1, wherein the result augmented reality element comprises a value representing a number of times the face interacted with a sequence of augmented reality elements that include the first and second augmented reality elements.

15. The method of claim 1, wherein the result augmented reality element comprises a success indicator when an interaction between the face and the first or second augmented reality element satisfies a goal and comprises a fail indicator when the interaction between the face and the first or second augmented reality element fails to satisfy the goal.

16. A system, comprising:
one or more processors; and
a non-transitory processor-readable storage medium coupled to the one or more processors, the non-transitory processor-readable storage medium storing processor executable instructions that, when executed by the one or more processors, cause the one or more processors to perform operations comprising:
detecting a face within a field of view of an image capture component associated with a device;
presenting within a graphical user interface the face and a first augmented reality element;
moving the first augmented reality element relative to the face in the graphical user interface;

detecting, as the first augmented reality element moves, a change in a feature of the face from a first state to a second state;

in response to detecting the change in the feature of the face from the first state to the second state:

modifying a visual attribute of the first augmented reality element based on a distance between the first augmented reality element and the feature of the face in the graphical user interface; and displaying, together with the first augmented reality element, a second augmented reality element having one or more visual characteristics that are similar to the first augmented reality element; and displaying, together with the face and the second augmented reality element, a result augmented reality element, the result augmented reality element representing an interaction between the face and the first and second augmented reality elements.

17. The system of claim 16, the operations further comprising:

determining an on-screen position of the face;

determining a spatial location of the first augmented reality element within the graphical user interface, the spatial location determined at a time the change in the feature is detected;

determining a proximity of the spatial location to the on-screen position of the face as being within a proximity threshold; and based on the proximity, presenting the second augmented reality element within graphical user interface along with the face.

18. The system of claim 16, wherein the feature is a mouth, and wherein modifying the visual attribute of the first augmented reality element further comprises:

determining the first augmented reality element, at a spatial location, Obscures at least a portion of the mouth, the portion of the mouth obscured by the first augmented reality element being an interior surface of the mouth;

in response to the first augmented reality element obscuring the portion of the mouth, modifying presentation of the first augmented reality element for a period of time prior to terminating presentation of the first augmented reality element; and causing presentation of the second augmented reality element spaced a distance apart from the face, the second augmented reality element moving along a trajectory toward the face.

19. The system of claim 16, wherein detecting the change further comprises:

identifying a change of position of the face, within the graphical user interface, from a first position to a second position;

in response to identifying the second position, determining a head location within the graphical user interface at a first time; and determining a spatial location of the first augmented reality element at a second time.

20. A non-transitory processor-readable storage medium storing processor executable instructions that, when executed by a processor of a machine, cause the machine to perform operations comprising:

detecting a face within a field of view of an image capture component associated with the device;

presenting within a graphical user interface the face and a first augmented reality element;

moving the first augmented reality element relative to the face in the graphical user interface;

detecting, as the first augmented reality element moves, a change in a feature of the face from a first state to a second state;

in response to detecting the change in the feature of the face from the first state to the second state:

modifying a visual attribute of the first augmented reality element based on a distance between the first augmented reality element and the feature of the face in the graphical user interface; and displaying, together with the first augmented reality element, a second augmented reality element having one or more visual characteristics that are similar to the first augmented reality element; and displaying, together with the face and the second augmented reality element, a result augmented reality element, the result augmented reality element representing an interaction between the face and the first and second augmented reality elements.

\* \* \* \* \*

UNITED STATES PATENT AND TRADEMARK OFFICE
CERTIFICATE OF CORRECTION

PATENT NO. : 10,996,811 B2  
APPLICATION NO. : 16/547045  
DATED : May 4, 2021  
INVENTOR(S) : Monastyrshyn et al.

Page 1 of 1

It is certified that error appears in the above-identified patent and that said Letters Patent is hereby corrected as shown below:

On the Title Page

On page 2, in Column 2, under "Other Publications", Line 12, delete "Augmemed" and insert --Augmented-- therefor In the Claims In Column 31, Line 36, in Claim 18, delete "Obscures" and insert --obscures-- therefor Signed and Sealed this
Seventeenth Day of August, 2021

Drew Hirshfeld
*Performing the Functions and Duties of the
Under Secretary of Commerce for Intellectual Property and
Director of the United States Patent and Trademark Office*